(12) United States Patent
Wadhwa et al.

(10) Patent No.: US 10,242,427 B2
(45) Date of Patent: Mar. 26, 2019

(54) DEVIATION MAGNIFICATION: REVEALING DEPARTURES FROM IDEAL GEOMETRIES

(71) Applicant: Massachusetts Institute of Technology, Cambridge, MA (US)

(72) Inventors: Neal Wadhwa, Cambridge, MA (US); Tali Dekel, Cambridge, MA (US); Donglai Wei, Arlington, MA (US); Frederic Pierre Durand, Somerville, MA (US); William T. Freeman, Acton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 126 days.

(21) Appl. No.: 15/223,438

(22) Filed: Jul. 29, 2016

(65) Prior Publication Data

US 2018/0032838 A1 Feb. 1, 2018

(51) Int. Cl.
*G06T 11/00* (2006.01)
*G06T 3/00* (2006.01)

(52) U.S. Cl.
CPC .......... *G06T 3/0093* (2013.01); *G06T 11/00* (2013.01); *G06T 11/001* (2013.01)

(58) Field of Classification Search
CPC ...... G06T 3/0093; G06T 11/00; G06T 11/001
See application file for complete search history.

(56) References Cited

U.S. PATENT DOCUMENTS 5,777,715 A * 7/1998 Kruegle ............... G02B 23/125
345/8
8,755,837 B2 * 6/2014 Rhoads ............. G06F 17/30244
455/556.1

(Continued)

OTHER PUBLICATIONS

Blanz, V., et al. "A Morphable Model for the Synthesis of 3D faces", In the Proceedings of the 26th Annual Conference on Computer Graphics and Interactive Techniques, pp. 187-194, (1999).

(Continued)

*Primary Examiner* — Mia M Thomas
(74) *Attorney, Agent, or Firm* — Hamilton, Brook, Smith & Reynolds, P.C.

(57) ABSTRACT

Geometries of the structures and objects deviate from their idealized models, while not always visible to the naked eye. Embodiments of the present invention reveal and visualize such subtle geometric deviations, which can contain useful, surprising information. In an embodiment of the present invention, a method can include fitting a model of a geometry to an input image, matting a region of the input image according to the model based on a sampling function, generating a deviation function based on the matted region, extrapolating the deviation function to an image wide warping field, and generating an output image by warping the input image according to the warping. In an embodiment of the present invention, Deviation Magnification inputs takes a still image or frame, fits parametric models to objects of interest, and generates an output image exaggerating departures from ideal geometries.

20 Claims, 21 Drawing Sheets
(19 of 21 Drawing Sheet(s) Filed in Color)

(56) References Cited

U.S. PATENT DOCUMENTS

| | | | | |
|---|---|---|---|---|
| 8,842,222 B2* | 9/2014 | Iversen | ............... | G06T 3/0093 |
| | | | | 345/626 |
| 8,886,206 B2* | 11/2014 | Lord | ............... | G06F 17/30244 |
| | | | | 348/241 |
| 8,929,877 B2* | 1/2015 | Rhoads | ............... | H04W 4/70 |
| | | | | 455/420 |
| 9,324,005 B2 | 4/2016 | Wadhwa | | |
| 9,759,902 B2* | 9/2017 | Sharma | ............... | G02B 21/365 |
| 9,792,530 B1* | 10/2017 | Wu | ............... | G06K 9/6253 |
| 9,805,475 B2 | 10/2017 | Rubinstein | | |
| 9,811,901 B2 | 11/2017 | Wu | | |
| 9,833,136 B2* | 12/2017 | Bagherinia | ............ | A61B 3/102 |
| 9,836,828 B2* | 12/2017 | Jones | ............... | G06T 5/006 |
| 2008/0013047 A1* | 1/2008 | Todd | ............... | A61B 3/0091 |
| | | | | 351/203 |
| 2008/0247620 A1* | 10/2008 | Lewis | ............... | G02B 27/017 |
| | | | | 382/128 |
| 2010/0016730 A1* | 1/2010 | Tanaka | ............... | A61B 3/024 |
| | | | | 600/476 |
| 2011/0109876 A1* | 5/2011 | Reichow | ............... | A61B 3/024 |
| | | | | 351/203 |
| 2012/0212594 A1* | 8/2012 | Barnes | ............... | G06T 11/60 |
| | | | | 348/62 |
| 2012/0249797 A1* | 10/2012 | Haddick | ............... | G06F 1/163 |
| | | | | 348/158 |
| 2014/0118402 A1* | 5/2014 | Gallo | ............... | G06T 5/50 |
| | | | | 345/646 |
| 2014/0192022 A1* | 7/2014 | Yamamoto | ............... | G06F 3/044 |
| | | | | 345/174 |
| 2015/0016679 A1* | 1/2015 | Cao | ............... | G06K 9/4642 |
| | | | | 382/103 |
| 2015/0131877 A1* | 5/2015 | Ivanov | ............... | G06K 9/00006 |
| | | | | 382/124 |
| 2015/0178935 A1* | 6/2015 | Morgan-Mar | ............... | G06T 7/0071 |
| | | | | 382/154 |
| 2015/0227774 A1* | 8/2015 | Balch | ............... | G06K 9/00033 |
| | | | | 382/124 |
| 2015/0227815 A1* | 8/2015 | Komatsu | ............... | G06T 7/0065 |
| | | | | 382/106 |
| 2015/0348327 A1* | 12/2015 | Zalewski | ............... | G06F 3/01 |
| | | | | 345/419 |
| 2015/0379714 A1* | 12/2015 | Cramer | ............... | G06T 7/73 |
| | | | | 382/291 |
| 2016/0062113 A1* | 3/2016 | El-Ghoroury | ............... | G02B 27/0101 |
| | | | | 345/647 |
| 2016/0098617 A1* | 4/2016 | Uno | ............... | G06T 7/001 |
| | | | | 382/218 |
| 2016/0125611 A1* | 5/2016 | Komatsu | ............... | G06T 7/0065 |
| | | | | 348/135 |
| 2016/0155419 A1* | 6/2016 | Miaw | ............... | H04N 17/02 |
| | | | | 345/428 |
| 2016/0156850 A1* | 6/2016 | Werblin | ............... | G06F 3/013 |
| | | | | 348/63 |
| 2016/0178881 A1* | 6/2016 | Sharma | ............... | G02B 21/365 |
| | | | | 382/218 |
| 2016/0189409 A1* | 6/2016 | Aiba | ............... | G09G 5/14 |
| | | | | 345/629 |
| 2017/0069103 A1* | 3/2017 | Gren | ............... | G06T 7/20 |
| 2018/0032838 A1* | 2/2018 | Wadhwa | ............... | G06K 9/6202 |
| 2018/0036175 A1* | 2/2018 | Rollend | ............... | A61F 9/08 |
| 2018/0053285 A1* | 2/2018 | Jones | ............... | G06T 15/04 |

OTHER PUBLICATIONS

Canny, J., "A Computational Approach to the Edge Detection", IEEE Transactions on Pattern Analysis and Machine Intelligence, vol. PAM-8, No. 6, Nov. 1986.

Dekel, T., et al., "Revealing and Modifying Non Local Variations in a Single Image", ACM Transactions on Graphics (TOG) Special Issue, (2015).

Dollar, P., et al., "Structured Forests for Fast Edge Detection", In Computer Vision (ICCV), IEEE International Conference on IEEE, pp. 1841-1848, (2013).

Dollar, P., et al., "Supervised Learning of Edges and Object Boundaries", In Computer Vision and Pattern Recognition, IEEE Computer Society Conference vol. 2, pp. 1964-1971 (2006).

Duda, R.O., et al., "Use of the Hough Transformation to Detect Lines and Curves in Pictures", Communications of the ACM 15:1, pp. 11-15 Jan. 197).

DxO OpticsPro 10, "Processing Your First Photo's with DxO OpticsPro 10". www.dxo.com/us/photograpghy/photo-software/dxo-opticspro Retrieved from Internet Nov. 15, 2017.

Elgharib, M., et al., "Video Magnification in Presence of Large Motions", In Proceedings of IEEE Conference on Computer Vision and Pattern Recognition, pp. 4119-4157 (2015).

Fischler, M.A., et al., "Random Sample Consensus: a Paradigm for Model Fitting with Applications to Image Analysis and Automated Cartography", SRI International, Technical Note 213, Mar. 1980.

Freeman, W.T., "The Design and Use of Steerable Filters", IEEE Transactions on Pattern Analysis and Machine Intelligence, 13:9, pp. 891-906, Sep. 1991.

Grossman, W.M., "Time Shift: Is London's Big Ben Falling Down", Scientific America, 2012. https://www.scientificamerican.com/article/is-londons-big-ben-falling/ Retrieved from Internet Nov. 15, 2017.

Hargather, M.J., et al., "Natural-Background-Oriented Schlieren Imaging", Experiments in Fluids, 48:1, pp. 59-68, (2010).

Hartley, R., et al. "Multiple View Geometry in Computer Vision" Cambridge University press. (2003).

Levin, A., et al. "Colorization Using Optimization" School of Computer Science and Engineering, The Hebrew University of Jerusalem, pp. 689-694 (2004).

Levin, A., et al., "A Closed Form Solution to Natural Image Matting", Pattern Analysis and Machine Intelligence, IEEE Transactions 30:2, pp. 228-242, Feb. 2008.

Lim, J.J., et al., "Sketch tokens: A Learned Mid-Level Representation for Contour and Object Detection", Computer Vision and Pattern Recognition, IEEE Conference, pp. 3158-3165 (2013).

Liu, C., "Motion Magnification", CSAIL Research Abstracts—2005 http://publications.csail.mit.edu/absstracts05/celiu/celiu.html Retrieved from Internet Nov. 15, 2017.

Lucas, B.D., et al. "An Iterative Image Registration Technique with an Application to Stereo Vision", Proceedings DARPA Image Understanding Workshiop, pp. 121-130, Apr. 1981.

Nalwa V.S., et al. "On Detecting Edges", Pattern Analysis and Machine Intelligence, Department of Computer Science, Stanford University, Mar. 1986.

Nichols, G., "Sedimentology and Stratigraphy", 2nd Edition, Wiley-Blackwell, (2009).

Patraucean, V., et al., "A Parameterless Line Segment and Elliptical Arc Detector with Enhanced Ellipse Fitting", Computer Vision, ECCV pp. 572-585 (2012).

Sutton, P.J., et al., "Gravitational Vortices and Clump Formation in Saturn's F Ring During an Encounter with Prometheus", Scientific Reports 3, Feb. 14, 2013.

Tritton, D.J., "Physical Fluid Dynamics", Oxford, Clarendon Press, 536, p. 1, 1988.

Wadhwa, N., et al., "Phase-based Video Motion Processing", ACM Transactions on Graphics, 32:4, Article 80, 9 pages, Jul. 2013.

Wadhwa, N. et al., "Riesz Pyramids for Fast Phase-Based Video Magnification." 2014 IEEE International Conference on Computational Photography (ICCP) (May 2014).

Wu, H.Y., et al., "Eulerian Video Magnification for Revealing Subtle Changes in the World", ACM Trans Graph 31:4, 65 (2012).

Xue, T., et al. "Refraction Wiggles for Measuring Fluid Depth and Velocity from Video." Lecture Notes in Computer Science (2014): 767-782.

* cited by examiner

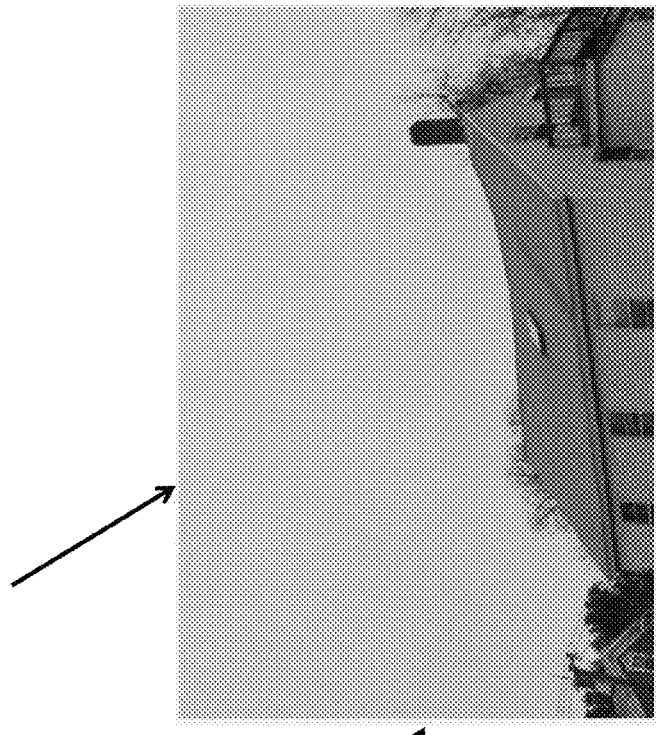

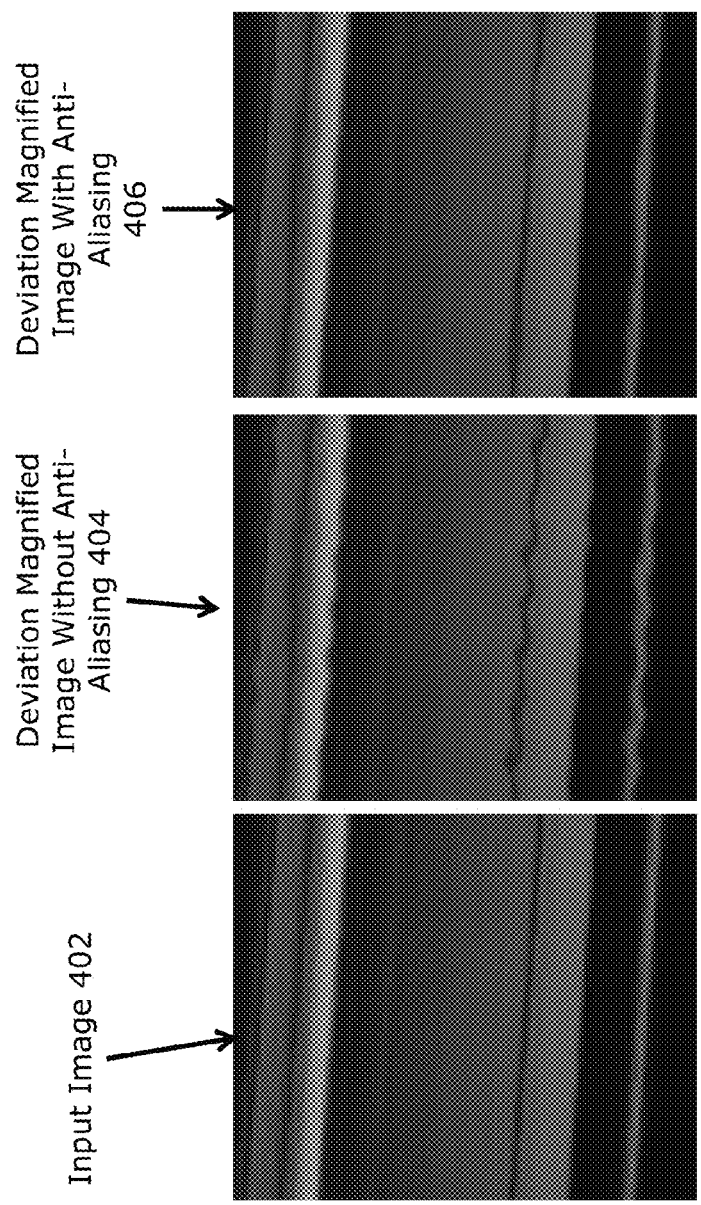

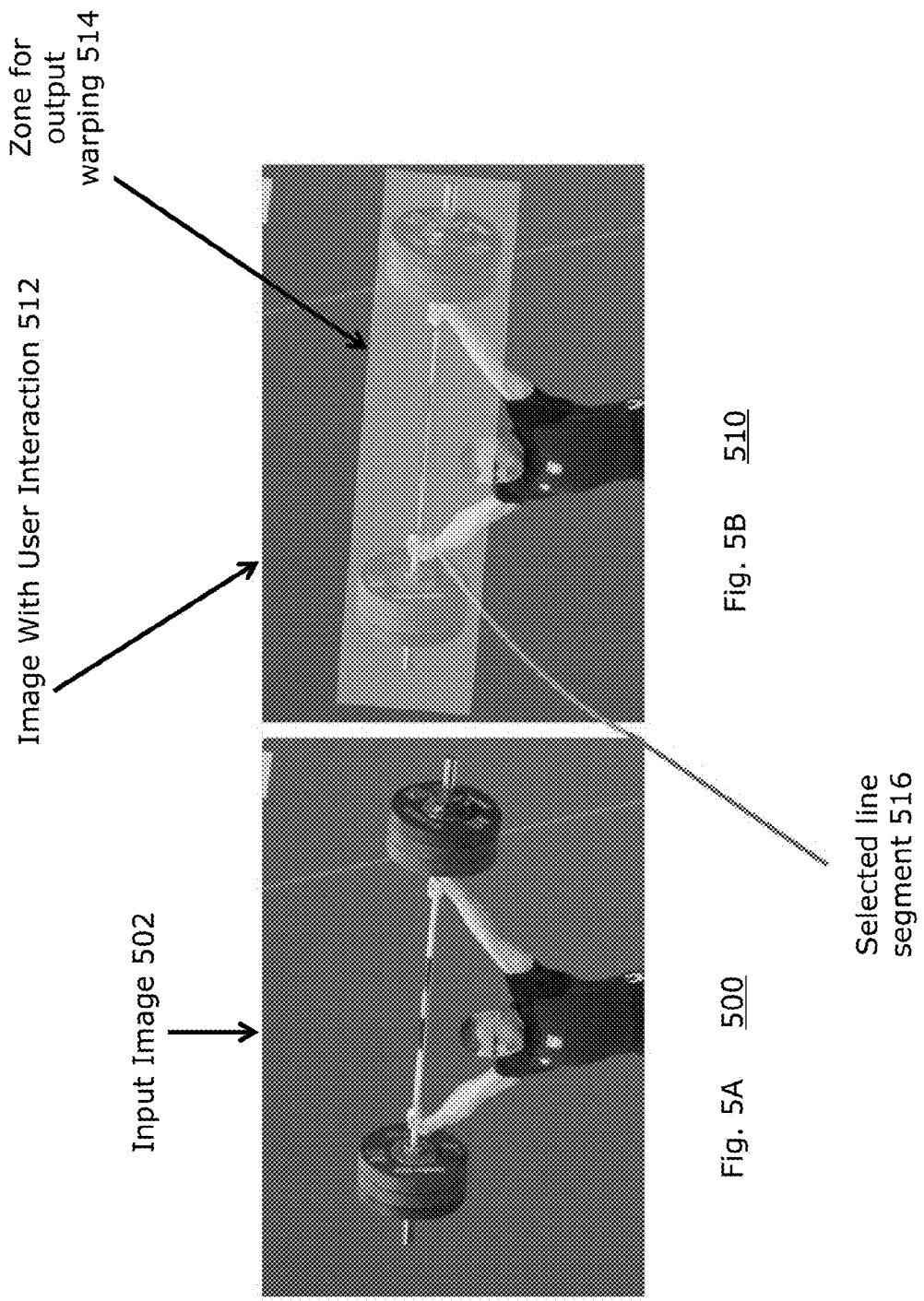

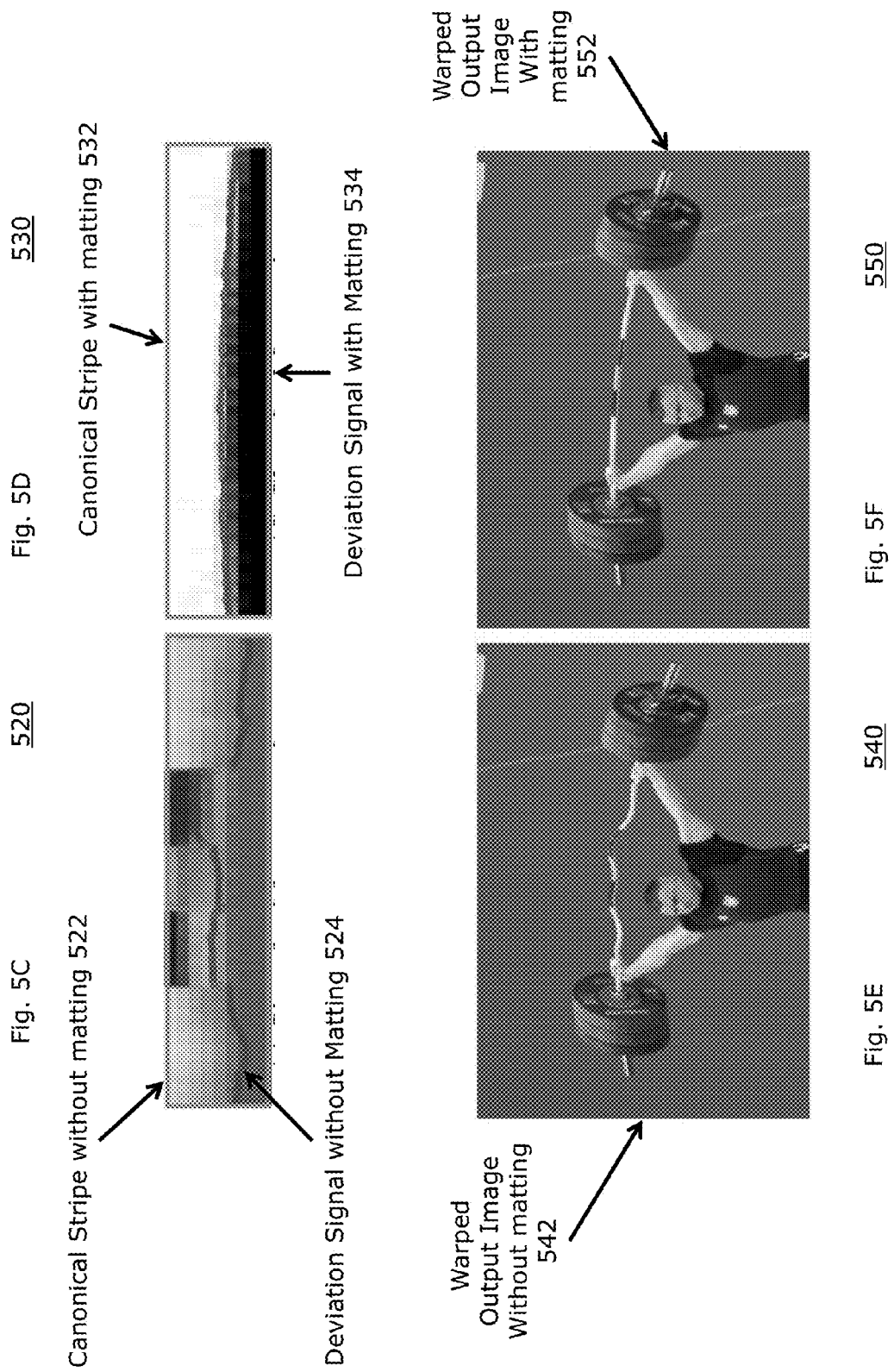

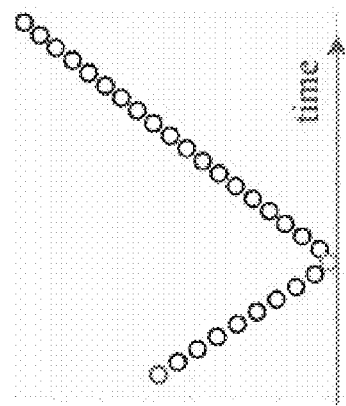
Fig. 7E 740
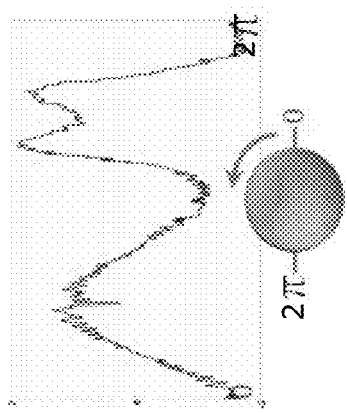
Fig. 7F 750
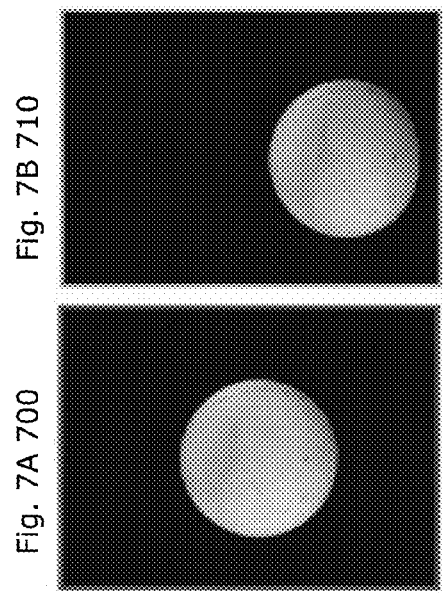
Fig. 7A 700
Fig. 7B 710
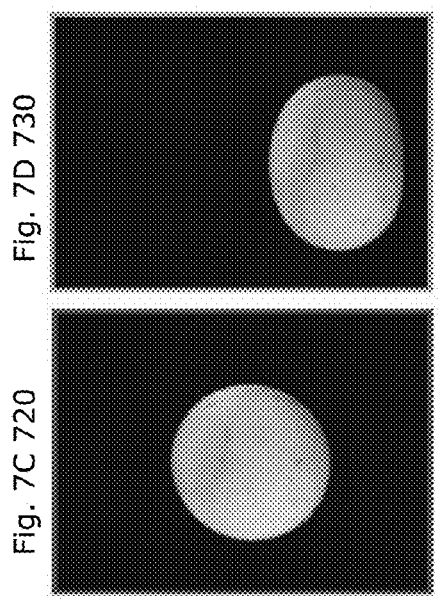
Fig. 7C 720
Fig. 7D 730

1410

Source of Deformation 1412

1430

Deviation Magnification (x7) 1432

Input Frame 1402

1400

Fitted Ellipses 1422

1420

1500

1600

DEVIATION MAGNIFICATION: REVEALING DEPARTURES FROM IDEAL GEOMETRIES

GOVERNMENT SUPPORT

This invention was made with government support under Grant No. IIS-1111415 awarded by the National Science Foundation and under Grant No. N00014-10-1-0951 awarded by the Office of Naval Research. The government has certain rights in the invention.

BACKGROUND

In unsharp masking, a blurred version of an image is used as a model and deviations from the model, are amplified to produce a sharpened image. Facial caricature which amplifiers deviations of a face image from an idealized model of a mean (average) face, are another example of such processing.

Motion magnification reveals deviations from a model, the direction of time, but does not need to detect the model because the direction of time in a video is readily given. In addition, motion magnification assumes that objects are nearly static (i.e., assumes the appearance over time to be nearly constant). In contrast, the present method amplifies deviations from a general spatial curve detected in a single image or frame. The type and location of this curve depends on the application, and the appearance along it may change dramatically.

Existing methods can reveal and estimate internal non parametric variations within an image, assuming that the image contains recurring patterns, and reveals the deviation from a perfect recurrence of the pattern. These methods estimate an "ideal" image with stronger repetitions, and generate a transformation bringing the input images closer to the ideal image. In contrast, the present method relies on parametric shapes within the image and thus can be applied for images without recurring structures. The present methods parametric approach reveals tiny, nearly invisible deviations, which cannot be estimated.

SUMMARY OF THE INVENTION

Structures and objects are often expected to have idealized geometries such as straight lines or circles. Although not always visible to the naked eye, in reality, the geometries of the structures and objects deviate from their idealized models. Embodiments of the present invention reveal and visualize such subtle geometric deviations, which can contain useful, surprising information. In an embodiment of the present invention, Deviation Magnification inputs takes a still image or frame, fits parametric models to objects of interest, and generates an output image exaggerating departures from ideal geometries.

Many phenomena can be characterized by an idealized geometry. For example, in ideal conditions, a soap bubble appears to be a perfect circle due to surface tension, buildings appear to be straight, and planetary rings form perfect elliptical orbits. In reality, however, the idealized geometry often does not exist. Even when invisible to the naked eye, objects often depart from models of their idealized geometry. In the presence of gravity, the bubble may be slightly oval, the building may sag or tilt, and the rings may have slight perturbations due to interactions with nearby moons. Deviation Magnification can estimate and visualize these subtle deviations from the models of idealized geometry, given only a single image as input. The tool outputs a new generated image in which the deviations from ideal are magnified. Embodiments of the present invention can reveal interesting and important information about the objects in the scene and their interaction with the environment.

FIGS. 1A-D are diagrams 100, 120, 140, and 160 illustrating two input images 102 and 142 and two warped output images 122 and 162 of a same house. The two warped output images are produced by an embodiment of the present invention that automatically reveals the sagging of the house roof by estimating its departure from a straight line. In FIGS. 1A and 1C, points $P_1$ and $P_2$ are endpoints of respective lines to inspect 104 and 144 of respective input images 102 and 142. The endpoints $P_1$ and $P_2$, and therefore the lines to inspect 104 and 144, can be entered by a user manually or detected by the system automatically. The system then processes the lines to inspect 104 and 144 and surrounding areas to generate a deviation function that represents deviations in the inputs images 102 and 142. Sometimes these deviations can be unseen or at the sub-pixel level. The method then amplifies these deviations to render a warped output image 122 and 162 having the amplified deviations 124 and 164, respectively.

The method first fits ideal geometric models (e.g., parametric shapes such as lines, circles and ellipses), to objects in the input image, and then examines the residual from the fit, rather than the fit itself. The method then processes and amplifies the residual to reveal the physical geometric departure of the object from its idealized shape.

Finding the departures from the fitted model is a complex process. These departures are often subtle (smaller than a pixel in some applications), and can be confused with non-geometric sources of deviations, such as image texture on the object. The method addresses these issues by combining careful sub-pixel sampling, reasoning about spatial aliasing, and image matting. Matting produces an alpha matte that matches the edge of the object to sub-pixel accuracy. Therefore, operating on the alpha matte allows preservation of the deviation signal while removing texture. The deviation signal is obtained by estimating small changes in the alpha matte's values, perpendicular to the contour of the shape. The resulting framework is generic, and is independent of the number or type of fitted shape models.

Deviation Magnification has a wide range of applications including construction, engineering, geology and astronomy. Examples include revealing invisible tilting of a tower, nearly invisible ripple marks on a sand dune and distortions in the rings of Saturn.

In an embodiment of the present invention, a method can include fitting a model of a geometry to an input image, matting a region of the input image according to the model based on a sampling function, generating a deviation function based on the matted region, extrapolating the deviation function to an image wide warping field, and generating an output image by warping the input image according to the warping.

In an embodiment, the method can further include generating the deviation function further includes generating a function $f(x)$, x representing coordinates of one of the axes, the value of $f(x)$ based on a value of $$\frac{\sum_y (I(x, y) - S(y))S'(y)}{\sum_y S'(y)^2},$$

I(x,y) representing an intensity profile of the matted region for given co-ordinates x and y, and S(y) represents an average of edge profiles for all values of x in relation to the matted region.

In an embodiment, fitting the model of the geometry to the input image further includes receiving an approximate model of a geometry from user input and fitting the model of the geometry based on a best match of the approximate model to the input image.

In an embodiment, fitting a model of a geometry to an input image includes automatically detecting at least one model of the input image.

In an embodiment, the model is can be expressed by a parametric equation.

In an embodiment, the sampling function further transforms the region of the input image to a canonical image stripe.

In an embodiment, fitting the model of the geometry to the input image includes fitting a plurality of models of at least one geometry to the input image. Matting the region of the input image further includes matting each region corresponding to each plurality of the models. Generating the deviation function further includes generating a plurality of deviation functions each based on a corresponding matted region. Extrapolating the deviation function to an image wide warping field further includes extrapolating each deviation function to a plurality of image wide warping fields. Generating the output image by warping the input image according to each image wide warping field.

In an embodiment, generating an output video based on a plurality of output images generated by performing the method separately on a series of frames independently.

In an embodiment, generating the output image further includes limiting the warping of the input image to at least one of (a) a user defined region, (b) a color change in the image, (c) a geometric change in the image, or (d) a region attenuated by distance from the model.

In another embodiment, a system includes a processor and a memory with computer code instructions stored therein. The memory is operatively coupled to the processor such that the computer code instructions configure the processor to implement a geometric fitting module configured to fit a model of a geometry to an input image. The computer code instructions further configure the processor to implement a matting module configured to matte a region of the input image according to the model based on a sampling function. The computer code instructions further configure the processor to implement an analysis module configured to generate a deviation function based on the matted region. The computer code instructions further configure the processor to implement a conversion module configured to extrapolate the deviation function to an image wide warping field. The computer code instructions further configure the processor to implement a warping module configured to generate an output image by warping the input image according to the warping.

In an embodiment, a non-transitory computer-readable medium is configured to store instructions for analyzing an image. The instructions, when loaded and executed by a processor, cam cause the processor to fit a model of a geometry to an input image, matte a region of the input image according to the model based on a sampling function, generate a deviation function based on the matted region, extrapolate the deviation function to an image wide warping field; and generate an output image by warping the input image according to the warping.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 1A-D are diagrams illustrating two input images and two warped output images of the same house.

FIG. 5

FIG. 4 is a diagram illustrating an example of amplifying deviations in an input image without removing aliasing artifacts and with removing the same.

FIG. 5A-B are diagrams illustrating an input image and user input before amplifying bending in a steel barbell of an input image due to the weights placed on either end by amplifying the low frequencies of the deviation from a straight line.

FIG. 5C is a diagram illustrating a canonical stripe without matting with respect to the image and selected line segment.

FIG. 5D is a diagram illustrating an example of a canonical stripe with matting with respect to the image and selected line segment.

FIG. 5E is a diagram illustrating a warped output image without matting showing an unstable, wavy barbell due to the incorrect deviation signal.

FIG. 5F is a diagram of a warped output image with matting showing the overall curvatures of the barbell being recovered and visualized correctly.

FIGS. 7A-B are diagrams illustrating frames of a a high speed video of a lacrosse ball hitting a black table in front of a black background.

FIGS. 7C-D are diagrams illustrating a rendering from the present method of the two input frames where the deviation is ten times larger.

FIG. 7E is a diagram illustrating trajectory of the ball throughout the video sequence.

FIG. 7F is a diagram illustrating the raw deviation signal for the moment of impact (e.g., FIGS. 7B and 7D) as a function of the angle of the edge of the ball from the center of the ball, in radians.

DETAILED DESCRIPTION OF THE INVENTION

A description of example embodiments of the invention follows.

In an embodiment of the present invention, a method detects and localizes edges, which existing techniques describe. One example class of techniques employ edges occurring at locations of steepest intensity, and are, therefore, being well-characterized by the peak of derivative filters of the image. More recently, some methods apply learning techniques to the problem of edge detection to better distinguish texture from edges. A flow-based method is ideal for embodiments of the present invention because deviations in the images are so small. Image matting further can remove texture variations that can influence the detected edge location.

In an embodiment of the present invention, a system and method reveal and magnify small deviations of objects from their idealized elementary shapes given a single input image.

Figure 2A:
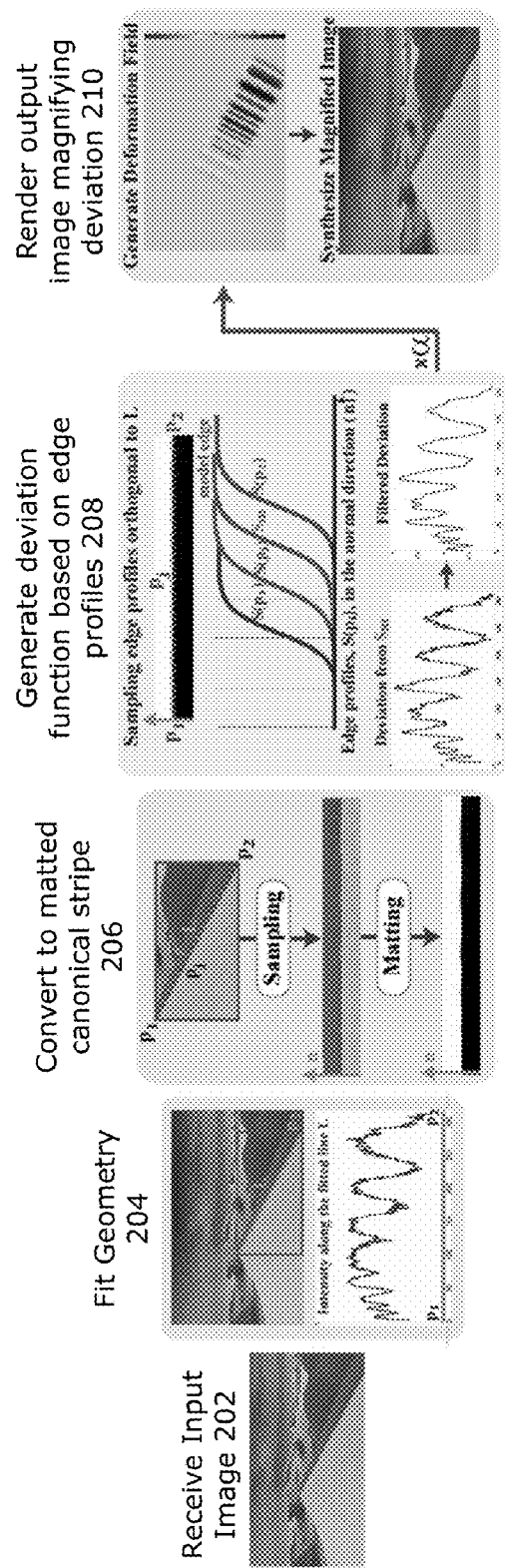
FIGS. 2A-B are block diagrams illustrating example embodiments of a method and corresponding system employed by the present invention.

FIG. 2A is a diagram 200 illustrating an example embodiment of a method employed by the present invention. Upon receiving an input image (202), the method fits a geometry (204) to the image by detecting elementary parametric shapes, such as lines, circles, or ellipses, in the input image. The detection of the parametric shapes can apply an automatic fitting system or method to detect all the shapes in the image and match an ideal parametric model to each shape. Alternatively, the fitting can be aided by user input that defines an approximate shape of the parametric model to search for, and an automatic method can solve for the exact parametric model the user intended to highlight. The detected shapes serve as the models from which the method computes deviations.

The method then performs a spatial analysis, with the estimated geometric models in hand, independent of the number and type of fitted shapes. The method converts/transforms a local region around each shape is a canonical image stripe (206). After being transformed into a canonical image stripe, the contour of the transformed shape and accompanying local region becomes a horizontal line and the local normal direction to the edge is aligned with the vertical axis (e.g., y-axis). A person of ordinary skill in the art can appreciate that a similar transformation can be performed to align the local normal direction to the edge with the horizontal axis (e.g., x-axis), however, for simplicity, the below describes a horizontal line with the normal direction being to the edge aligned with the vertical axis. In FIG. 2A, the normal axis n is shown to be orthogonal to the line L between endpoints $P_1$ and $P_2$ at any given point $P_j$. A person of ordinary skill in the art can recognize that the normal axis n is orthogonal to any point $P_j$ in any other shape as well, such as circles or ellipses. In the sampled canonical image stripe, the n axis is vertical, indicating that each vertical row is a representation of the normal axis along line L, or any other shape, at a given point.

The canonical image stripe is then converted to a matte stripe using a matting method to reduce the impact of imperfections that are caused by image texture and noise. The matted stripe is oriented with the same axis n as the initial canonical image stripe. Conversion to a matte stripe, or canonical matte, significantly improves the signal-to-noise ratio, improves results of the method, and can therefore be applied to more real-world scenarios.

The method then generates a deviation function from an ideal horizontal edge (with respect to the matted canonical image stripe) based on edge profiles using the matted canonical image stripe (208). The method first computes edge profiles $S(P_j)$ for each horizontal position $P_j$ between $P_1$ and $P_2$ in the matted canonical image stripe from one-dimensional (1D) translations between vertical slices (at each position, j) in the matted stripe, assuming the vertical slices have the same shape along the stripe. The deviation function is the amount of deviation of each edge profile from an estimated ideal, or model, geometry edge profile $S_m$. For each canonical matte, this process yields a deviation signal corresponding to the deviation from the associated model shape in the original image, in the local normal direction. Depending on the application, the deviation signals may be low-passed or bandpassed with the user-specified cutoffs to isolate the deviation of interest.

Next, the method visually reveals the deviation signal by rendering a new image that magnifies the deviations (210). Specifically, a the method generates a two-dimensional (2D)

deformation field based on the 1D computed deviation signals, and the method warps the input image based on the 2D deformation field.

Figure 2B:
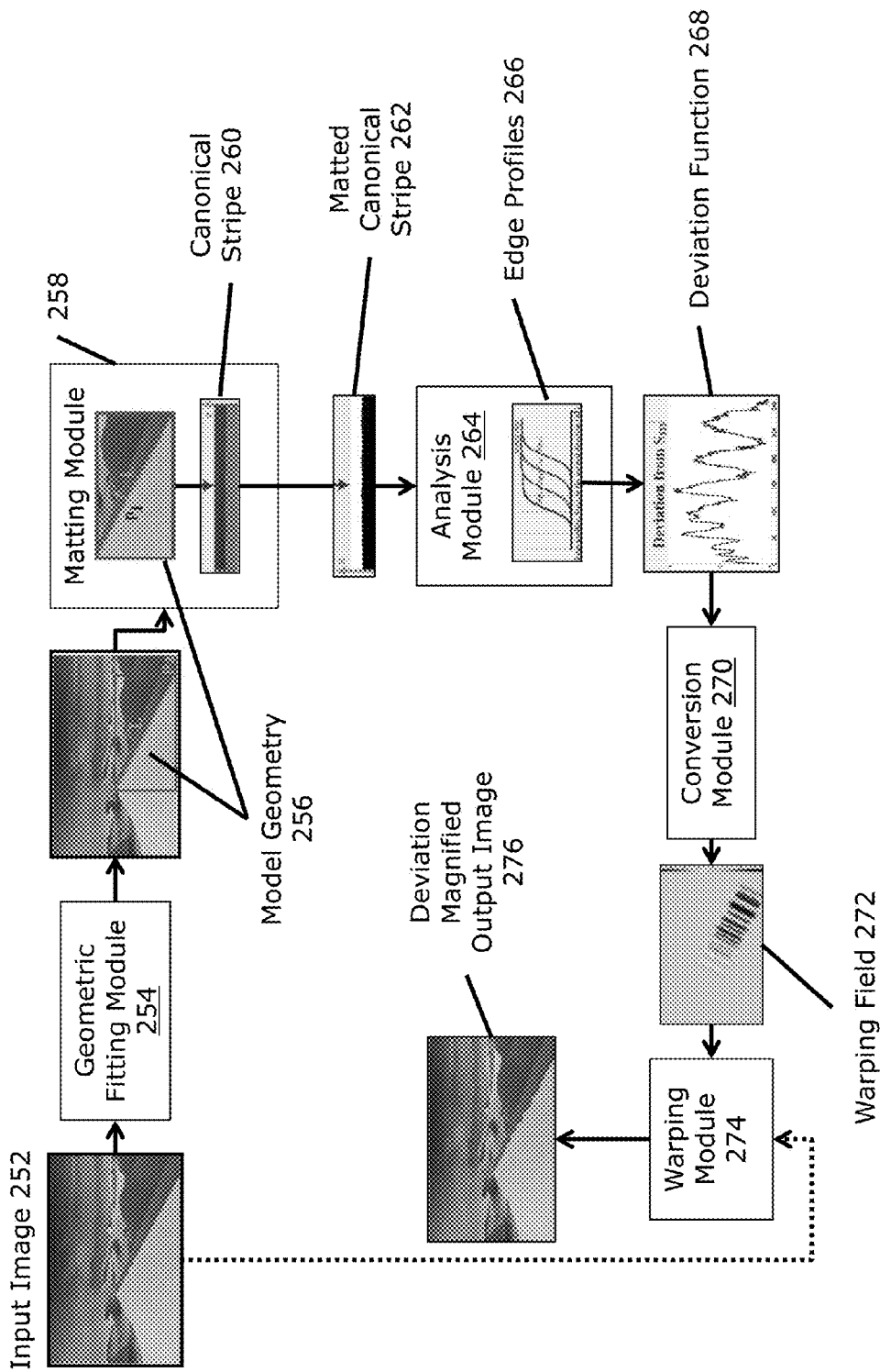

FIG. 2B is a block diagram 250 illustrating an example embodiment of a system employed by the present invention. A geometric fitting module 254 determines a model geometry 256 (e.g., line L between points $P_1$ and $P_2$) from an input image 252. A matting module generates a matted canonical stripe 262 from the model geometry 256 and surrounding regions, optionally converting to an intermediary canonical stripe 260 or using a transform function to directly generate the matted canonical stripe 262. An analysis module 264 generates a deviation function 268 based on edge profiles 266 of the matted canonical stripe 262 at each horizontal point. A conversion module 270 generates a warping field 272 based on the deviation function 268. The warping module 274 then applies the warping field 272 to the input image to generate the deviation magnified output image 276.

Deviations from a Parametric Shape

Figure 3:
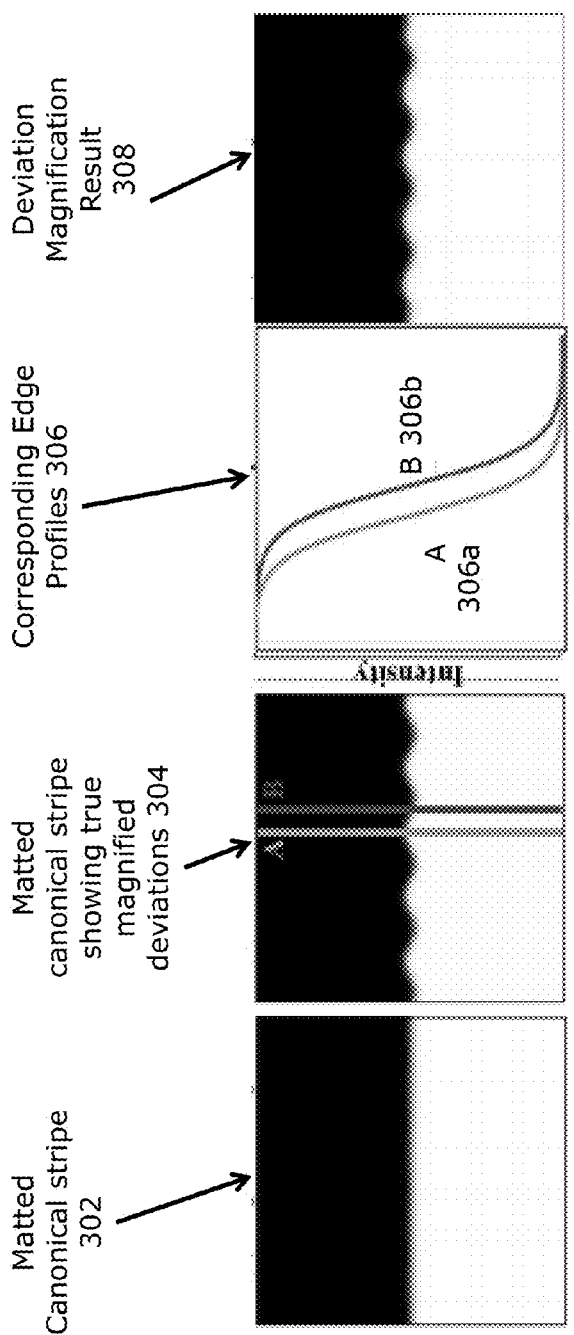
FIG. 3 is a diagram illustrating a synthetic image I(x,y), which has an edge along the x-axis, as a model of a matted image stripe.

FIG. 3 is a diagram illustrating a synthetic image I(x,y) 302, which has an edge along the x-axis, as a model of a matted image stripe. The edge appears to the human eye to be an ideal horizontal line geometrically, however, the edge has a subtle deviation from its ideal, straight geometry. The matted canonical stripe showing true magnified deviations 304 illustrates the edge magnified twenty times, and further shows example vertical stripes A and B. The method estimates the deviation signal $f(x)$ at every location x along the edge. To do so, the method examines vertical slices, or edge profiles, of the image I, (e.g., the intensity values along the vertical lines A or B). The corresponding edge profiles 306 at location x are defined as:

$$S_x(y):=I(x,y). \quad (1)$$

With no deviation (e.g., $\forall x\ f(x)=0$), the edge profiles are constant along the edge, (i.e. $S_x(y)=S(y)$). The deviation function, $f(x)$, causes this common edge profile to translate:

$$S_x(y)=S(y+f(x)). \quad (2)$$

Embodiments of the present invention solve for the deviation function, $f(x)$, given the observations $S_x(y)$ as described herein.

First, the method generates the underlying common edge profile S(y) by aggregating information from all available edge profiles. To do so, the mean of the edge profiles can be used to compute S(y) because the deviation function, $f(x)$, is by definition small and therefore does not affect the mean. Assuming that image noise is independent at every pixel, the image I is given by:

$$I(x,y)=S(y+f(x))+n(x,y) \quad (3)$$

where n(x,y) represents the image noise. A first order Taylor expansion of $S(y+f(x))$ leads to the expression:

$$I(x,y)\approx S(y)+f(x)S'(y)+n(x,y). \quad (4)$$

Thus, the means over x is given by $$\frac{1}{N_x}\sum_x I(x,y) \approx S(y) + \mu_f S'(y) + \frac{1}{N_x}\sum_x n(x,y) \quad (5)$$

where the $\mu_f$ represents the mean (average) of $f(x)$ over x and $N_x$ is the number of pixels in the x direction. The new noise term is a function only of y because it is being summed for all values of x and has less variance than the original noise n(x,y). Since $f(x)$ is small, its corresponding $\mu_f$ is also small. Therefore, $$\frac{1}{N_x}\sum_x I(x,y) \approx S(y) + \mu_f S'(y) + \frac{1}{N_x}\sum_x n(x,y) \quad (6)$$

$$\approx S(y) + \mu_f S'(y) \approx S(y+\mu_f).$$

Thus, the average edge profile approximates the common edge profile up to a constant shift, $\mu_f$. This shift is insignificant because it reflects a constant shift of $f(x)$, (e.g., a global translation of the object interest). Moreover, for many applications, the global translation can be filtered out by band-passing the deviation signal. Therefore, for convenience, the translated edge profile is treated as the original edge profile S(y). In practice, to be more robust to outliers in the edge profiles, the process employs the median average instead of the mean average.

Having the values of S(y), the method obtains the deviation signal $f(x)$ by estimating an optimal 1D translation, in terms of least square error, between the S(y) and each of the observed ones. In the discrete domain, this is expressed as:

$$\sum_y (I(x,y) - S(y) - f(x)S'(y))^2, \quad (7)$$

which is further expressed as:

$$f(x) \approx \frac{\sum_y (I(x,y) - S(y))S'(y)}{\sum_y S'(y)^2} \quad (8)$$

As can be seen from the above equations, pixels for which S'(y)=0 do not contribute to the solution. Having the deviation function, $f(x)$, in hand, the method can produce the deviation magnification result 308.

To create the canonical stripe (e.g., 206 of FIG. 2A), the region in the vicinity of each fitted shape in warped into a canonical stripe. The canonical stripe representation enables treating any type of fitted shape in the image as a horizontal line in the canonical stripe. In other words, with any parametric shape modeled in the input image, the conversion to the canonical stripe representation allows for any later processing to be agnostic of the parametric shape. Converting the parametric shape and surrounding regions to a constant horizontal line allows a same process to determine the deviation function, as described above. For example, a diagonal line, circle, ellipse, parabola, or any parametric shape in the image become a horizontal line in the canonical stripe. In other embodiments, a person of ordinary skill in the art can recognize that a canonical shape transfer function can map the local region to the equivalent of a warped region without warping the region itself. However, for simplicity, embodiments of the present invention herein describe the region being warped.

For an arbitrary geometric shape, assume $\{\vec{p}_i\}$ are a set of points sampled along it. The shape has a local normal direction at every point, which is denoted by $\vec{n}(\vec{p}_i)$. For each point, the image is sampled in the positive and negative normal direction $\pm \vec{n}(\vec{p}_i)$, using bicubic interpolation to produce the canonical stripe. The image is sampled at a half pixel resolution to prevent spatial aliasing, which may occur for high frequency diagonally oriented textures. To prevent image content far from the shape from affecting the deviation signal, the method only samples a few pixels from the shape (e.g., 3-5 pixels, however, a person of ordinary skill in the art can recognize that in larger pictures, a larger sample size may be employed). In the resulting stripe, the edge becomes a horizontal line and the vertical axis is the local normal direction $\vec{n}(p_j)$.

In many cases, the image may be highly textured near the shape's contour, which can invalidate the assumption of a constant edge profile inherent in Equation 2. A matting system, similar to one proposed "A Closed-Form Solution to Natural Image Matting" by Levin et al. in Pattern Analysis and Machine Intelligence, IEEE Transactions on 30, 2, 228-242 (hereinafter "Levin 2008"), which is herein incorporated by reference in its entirety, can be applied to the sampled canonical image stripe. The outputted alpha matte has the same sub-pixel edge location as the input image, but removes variations due to texture and converts real image stripes into ones that more closely satisfy the constant edge profile assumption.

The matting process converts the canonical image stripe and automatically generates a mask in which pixels on one side of the contour are marked as foreground and pixels on the other side as background. This generated mask allows the method described herein to determine information about where the edge is. Generating the mask increases the signal-to-noise ratio, which assists in extrapolating valuable data from the mask.

As described above, the method derives the deviation signal, $f(x)$, based on the estimated alpha matte, and therefore represents the amount that the shape in the image deviates from the ideal shape of the model in the local normal direction of the ideal shape.

Spatial Anti-Aliasing

FIG. 4 is a diagram 400 illustrating an example of amplifying deviations in an input image 402 without removing aliasing artifacts 404 and with removing the same 406. For some images (e.g., astronomy), spatial aliasing in the input image can also be present in the canonical strip, and subsequently the deviation signal masquerading as a true signal. To prevent this, the method applies a dedicated spatial anti-aliasing post filter to remove these aliasing components. Theoretically, spatial aliasing can occur at any frequency. However, spatial aliasing can be computed as depending from orientation of an edge. Once the aliasing is computed, the aliasing is filtered out by filtering the frequency of the aliasing. An anti-aliasing filter may not have a significant impact on all images since reasonable camera pre-filters often prevent aliasing. However, the anti-aliasing filter can be applied to make sure that no aliasing artifacts are in images and ensure a more accurate result.

Figure 15:
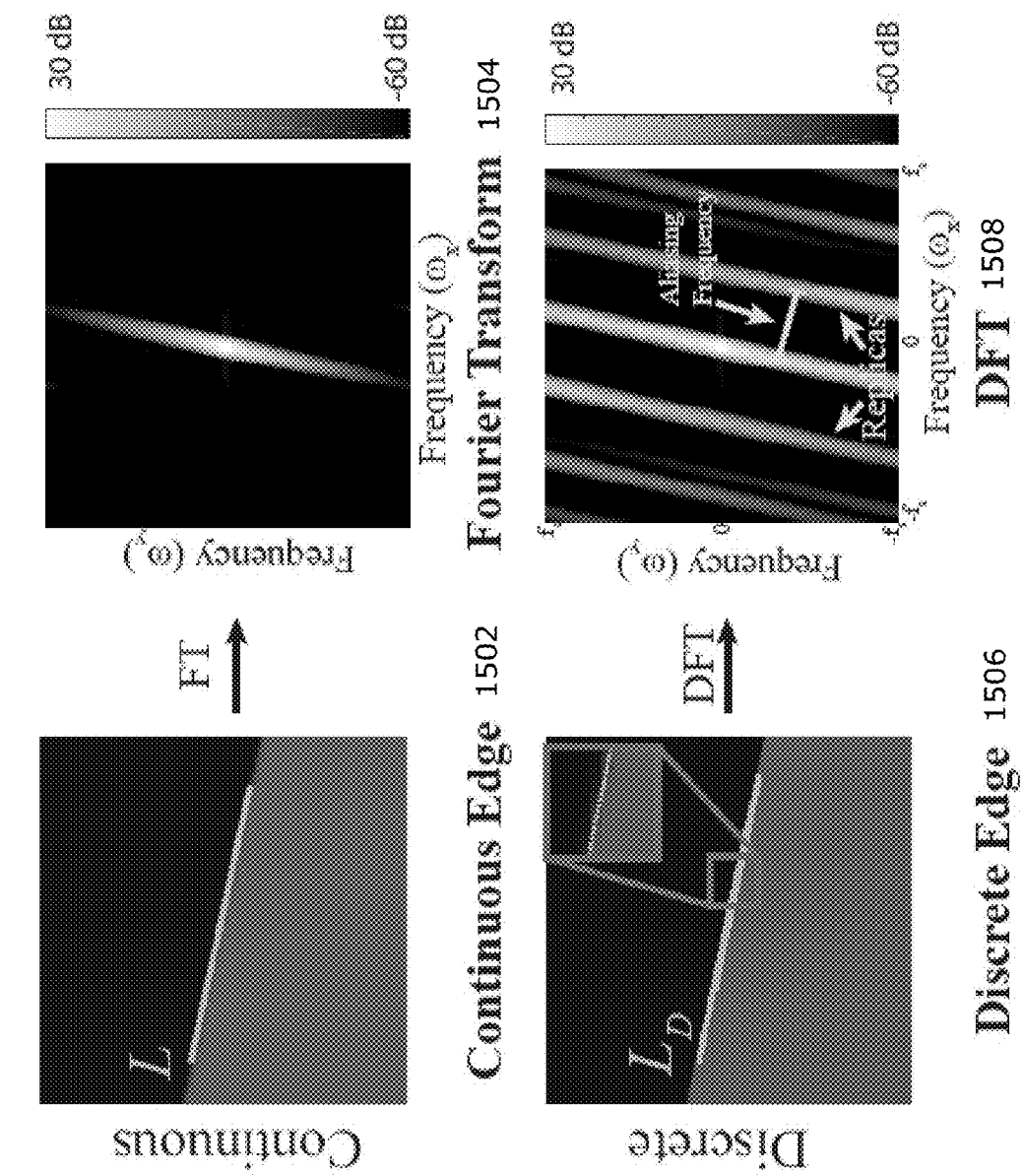
FIG. 15 is a diagram illustrating an example image of a continuous edge, represented by I(x,y), having an orientation angle $\theta$.

FIG. 15 is a diagram 1500 illustrating an example image of a respective continuous edge 1502 and discrete edge 1506, represented by I(x,y), having an orientation angle θ, corresponding with Fourier Transforms 1504 and 1508. A two-dimensional (2D) Fourier transform 1504 of the image $F(\omega_x, \omega_y)$ is a straight line of orientation $\theta+\pi/2$ in the frequency domain, if the edge profiles along the formed line L of the continuous edge 1502 are constant. When the continuous scene radiance is sampled, a periodicity is induced in $F(\omega_x, \omega_y)$. That is, the Fourier transform of the discrete image $I_D(x,y)$ is equal to:

$$F(I_D(x, y)) = \sum_{n=-\infty}^{\infty} \sum_{m=-\infty}^{\infty} F(\omega_x - nf_s, \omega_y - mf_s) \quad \text{(AA-1)}$$

where $f_s$ is the spatial sampling rate of the camera.

Further, a disecrete edge 1506 also has a corresponding discrete Fourier transform (DFT) 1508 of the discrete edge 1506 having periodicity that creates replicas in the Fourier transform that may alias into spatial frequencies along the direction of the edge. The present anti-aliasing aims to derive the specific frequencies at which these replicas occur.

Since the deviation signal is computed for the line L, the anti-aliasing technique is concerned with aliasing that occurs along this line L. Thus, the anti-aliasing method derives the 1D Fourier transform of the intensities on the discrete line $L_D$ via the sampled image's Fourier transform $F(I_D(x,y))$. Since $F(\omega_x, \omega_y)$ is non-zero only along the line perpendicular to L, the discrete Fourier transform $F(I_D(x,y))$ contains replicas of this line centered at $n(f_s,0)+m(0,f_s)$ for integer n and m (from Eq. AA-1). Using the slice-projection theorem, the 1D Fourier transform of $L_D$ is given by the projection of $F(I_D(x,y))$, i,e, the image's 2D Fourier transform, onto a line with orientation θ that passes through the origin. This means that the replica's project all of their energy onto a single point on $L_D$ at location $$nf_s \cos(\theta)+mf_s \sin(\theta), \quad \text{(AA-2)}$$

which reveals the value of the aliasing frequencies along the image slices. The first and usually most dominant such frequency occurs when exactly one of n or m is equal to one and has a value of $$f_s \min(|\cos(\theta)|,|\sin(\theta)|). \quad \text{(AA-3)}$$

The exact strength and importance of each aliasing frequency depends on the edge profile. Since most real images are taken with cameras with optical anti-aliasing prefilters, they have softer edges. Such pre-filters can be sufficient to only remove the lowest aliasing frequency (Eq. AA-3) to mitigate the effects of aliasing. To handle small deviations in orientation, the anti-aliasing methods remove a range of frequencies near the aliasing frequency (Eq. AA-3).

After generating a deviation signal for every fitted or user chosen contour in the image, the method generates a new image, in which the objects carrying the deviations are warped, but other image content is not. First, the method computes a 2D warping field:

$$\vec{V}(x,y)=\{u(x,y),v(x,y)\} \quad (9)$$

that is constrained to match the amplified deviation signal at sampled locations along the contours. The flow field at the remaining pixels is determined by minimizing an objective function that aims to propagate the field to nearby pixels of similar color, which setting the field to zero far from the contours. By construction, the deviation signal is oriented in the normal direction to the contour at each point. At a pixel $\vec{p}:=(x,y)$ sampled along the $s^{th}$ contour, the warping field is equal to $$\vec{V}(\vec{p})=\alpha f_s(\vec{p})\vec{n}_s(\vec{p}) \quad (10)$$

where α is an amplification factor, $f_s(\vec{p})$ is the deviation signal of the $s^{th}$ contour at location $\vec{p}$ and $n_s(\vec{p})$ is the local normal direction of the s contour at $\vec{p}$. Every pixel that touches a contour introduces a hard constraint of this form. If a pixel is on two contours, the method averages the constraints.

The hard constraints on the warping field imposed by Eq. 10 give the sparse information to be propagated to the rest of the image. "Colorization using optimization" by Levin et al., 2004 (hereinafter "Levin 2004"), which is herein incorporated by reference in its entirety, provides a method to define the following objective function for the horizontal component u (e.g., the same objective is defined for the vertical component):

$$\operatorname{argmin}_u \sum_{\vec{p}} \left( \left( u(\vec{p}) - D(\vec{p}) \sum_{\vec{q} \in N(\vec{p})} w_{\vec{p}\vec{q}} u(\vec{q}) \right)^2 \right), \quad (11)$$

where $\vec{p}$ and $\vec{q}$ are coordinates in the image, $N(\vec{p})$ is the eight pixel neighborhood around $\vec{p}$, $w_{\vec{p}\vec{q}} = \exp^{-PI(\vec{p}) - I(\vec{q})P^2/2\sigma^2}$ is a weighting function measuring the similarity of neighboring pixels, and $D(\vec{p})$ is a weighting function measuring the distance from the point $\vec{p}$ to the nearest point on a contour (e.g., compound using the distance transform). The inner sum in the objective function is the average warping field of all pixels of similar color to $\vec{p}$ in its neighborhood. The term $D(\vec{p})$ shrinks at pixels far from the contours. At pixels far from contours, $D(\vec{p})$ is close to zero and the summand becomes $u(\vec{p})^2$, which encourages the warping field to go to zero. Since the objective function is at least squares problem, it can be minimized by solving a sparse linear system.

Once the warping field is estimated, the rendered image is then given by inverse warping $$I_{dev} = I(\overline{x + u, y + v}) \quad (12)$$

While the present method can process the input images automatically, the user can also have the ability to control which objects or contours are analyzed, what components of the deviation signal should be amplified, and what parts of the image should be warped.

A graphical user interface (GUI) can be provided for users to pick specific objects to amplify. The user can provide via a user input device a rough outline, scribble, or indication of the object to amplify because it can be tedious to specify the exact location of a contour in the image through unassisted user input. An automatic fitting algorithm finds the location of all the elementary shapes in the object, and the one closest to the user input is chosen as the shape to amplify. "A parameterless line segment and elliptical arc detector with enhanced ellipse fitting" by Patraucean, et al., 2012 (hereinafter "Patraucean), which is herein incorporated by reference in its entirety, describes one example of an automatic fitting algorithm finding all elementary shapes in an object.

Figure 1A:
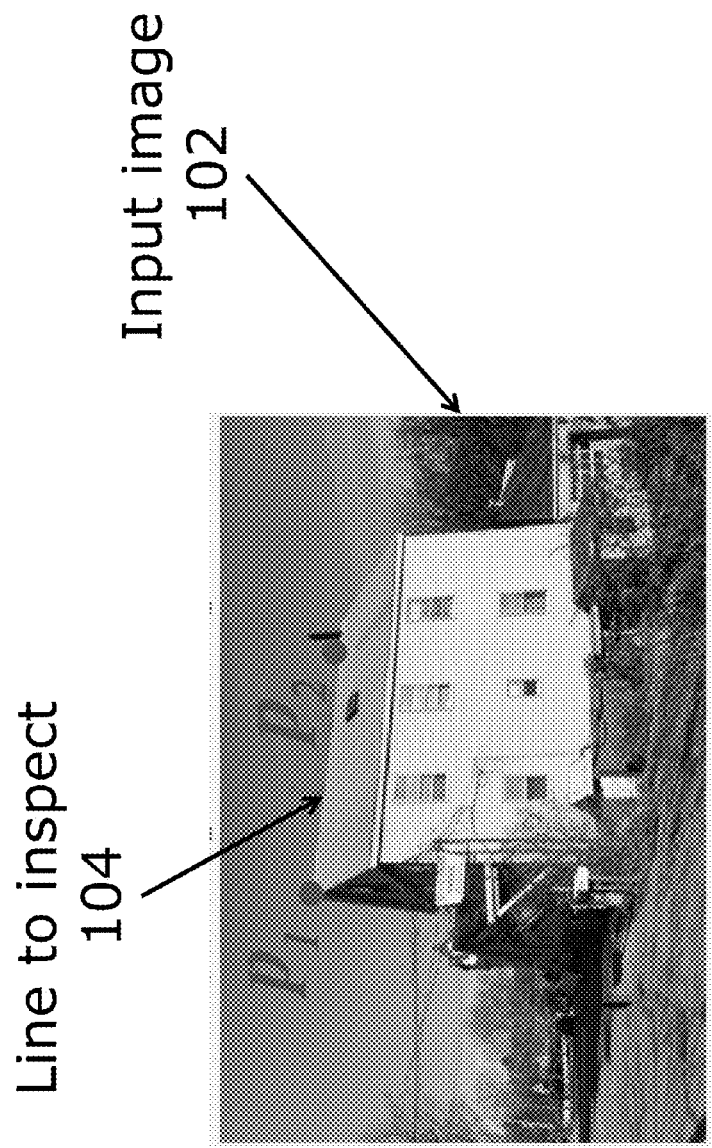
Figure 1B:
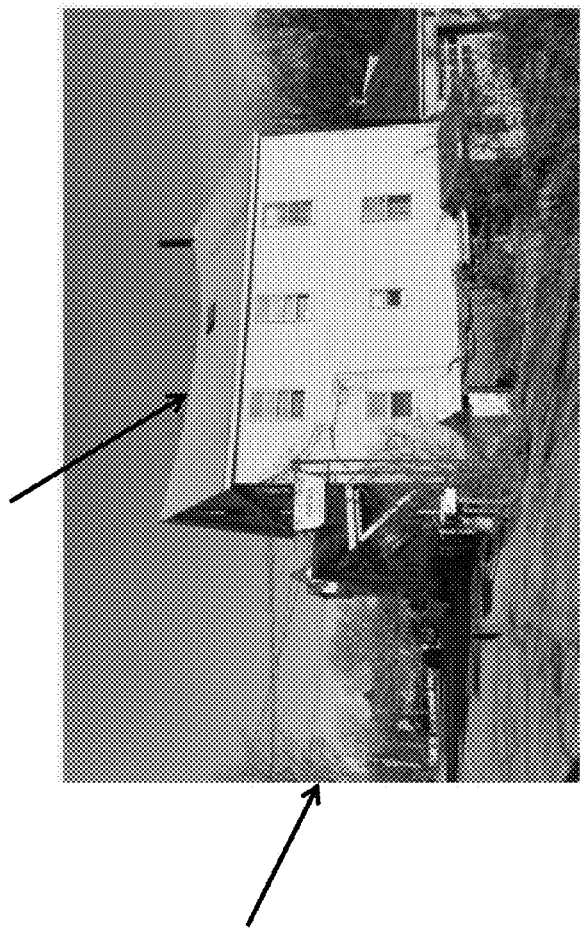
Figure 1C:
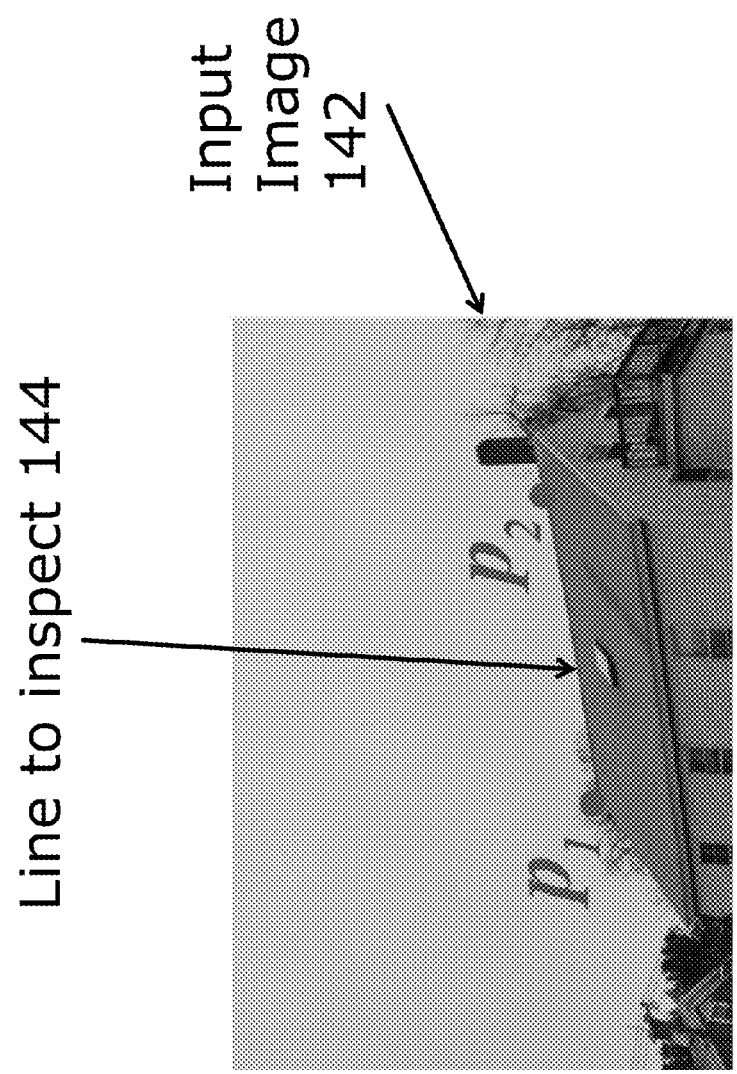

For a contour specified by points $\{\vec{p}_i\}$, the raw deviation signal $f(\vec{p}_i)$ can contain signals that correspond to several different types of deviations. In addition, the DC component of the signal corresponds to an overall shift of the entire object, and can be adjusted for or removed. Noise may also be present in the deviation signal. For these reasons, bandpass filtering can process the raw signal deviation signal, $f(x)$, and remove noise. The user can specify the cutoffs of the filter depending on the application. For example, in the sand dune example of FIG. 2A, the method removed low and high frequencies to remove noise and the overall curvature of the dune. Further, in the house example of FIG. 1, the method amplified low frequencies, setting the DC to make sure the deviation signal is zero at the endpoints of the line, such that the endpoints themselves did not get warped. The user also specifies the amplification factor indicting the amount by which the deviations should be magnified.

FIG. 5B is a diagram illustrating an example of user input defining an area of interest for warping the output image. In cases when the fitted shapes are straight lines, the user can specify the bounding box around the contour of interest to ensure that everything within the bounding box gets warped according to the deviation signal, $f(x)$. The diagonal of the bounding box is projected onto the fitted line. In the direction parallel to the line, the deviation signal is extrapolated to the ends of the box using quadratic extrapolation of the points close to the end. For all other points in the bounding box, the hard constraints of the above objective function are modified. Specifically, for each point $\vec{p}$ in the bounding box, the warping field at $\vec{p}$ is set to be the same hard constraint as the nearest point on the contour $\vec{q}$. This ensures that all objects within the bounding box get warped in the same way.

In some examples, the method can correct for lens distortion to prevent it from being interpreted as deviations from straight lines.

FIGS. 1A-D are diagrams revealing a roof of a house sagging by amplifying the deviations from a straight line fitted to the upper part of the roof. To validate, two different images of the house in which the roof is at different locations of the image are processed, illustrated in FIGS. 1A and 1C, respectively. As can be seen in the deviation magnified images in FIGS. 1B and 1D respectively, the sagging of the roof remains consistent across the different views. Revealing the subtle sagging of the roof can be a useful indication of when it needs to be repaired. In this example, the effect of the lens distortion may not be negligible because the house's roof spans such a large part of the image. Therefore, to avoid this problem, DxO Optics Pro 10 can correct for lens distortion, but other methods can correct for lens distortion as well.

FIG. 2A is a diagram 200 illustrating revealing a periodic ripple pattern along the side of a sand dune by amplifying its deviations from a straight line by ten times. Here, even the intensity variations along the line show the deviations. The raw signal is bandpassed to visualize only the ripple marks and not overall curvature of the dune. Knowing what these imperceptible ripple marks look like can have applications in geology.

FIG. 5A-B are diagrams 500 and 510 illustrating an input image 502 and user input 512 and 514 before amplifying bending in a steel barbell of an input image 502 due to the weights placed on either end by amplifying the low frequencies of the deviation from a straight line. In addition, the user specifies, on an image with user interaction 512, a selected line segment 516 to be analyzed and a region of interest 514 for the image warping to be applied to, marked in green in FIG. 5B, specifying the part of the image to be warped.

In this example, the advantage of applying matting is demonstrated in FIGS. 5C-5F. FIG. 5C is a diagram 520 illustrating a canonical stripe without matting, and FIG. 5D is a diagram 530 illustrating an example of a canonical stripe with matting 532, both with respect to the image 512 and selected line segment 516. Without matting, in reference to FIG. 5C, the color difference between the darker and lighter parts of the barbell causes a shift in the raw deviation signal 524 without matting. FIG. 5E is a diagram illustrating a warped output image without matting 542 showing an unstable, wavy barbell due to the incorrect deviation signal. FIG. 5F, on the other hand, is a diagram 550 of a warped output image with matting 552 showing the overall curvatures of the barbell being recovered and visualized correctly.

Figure 6:
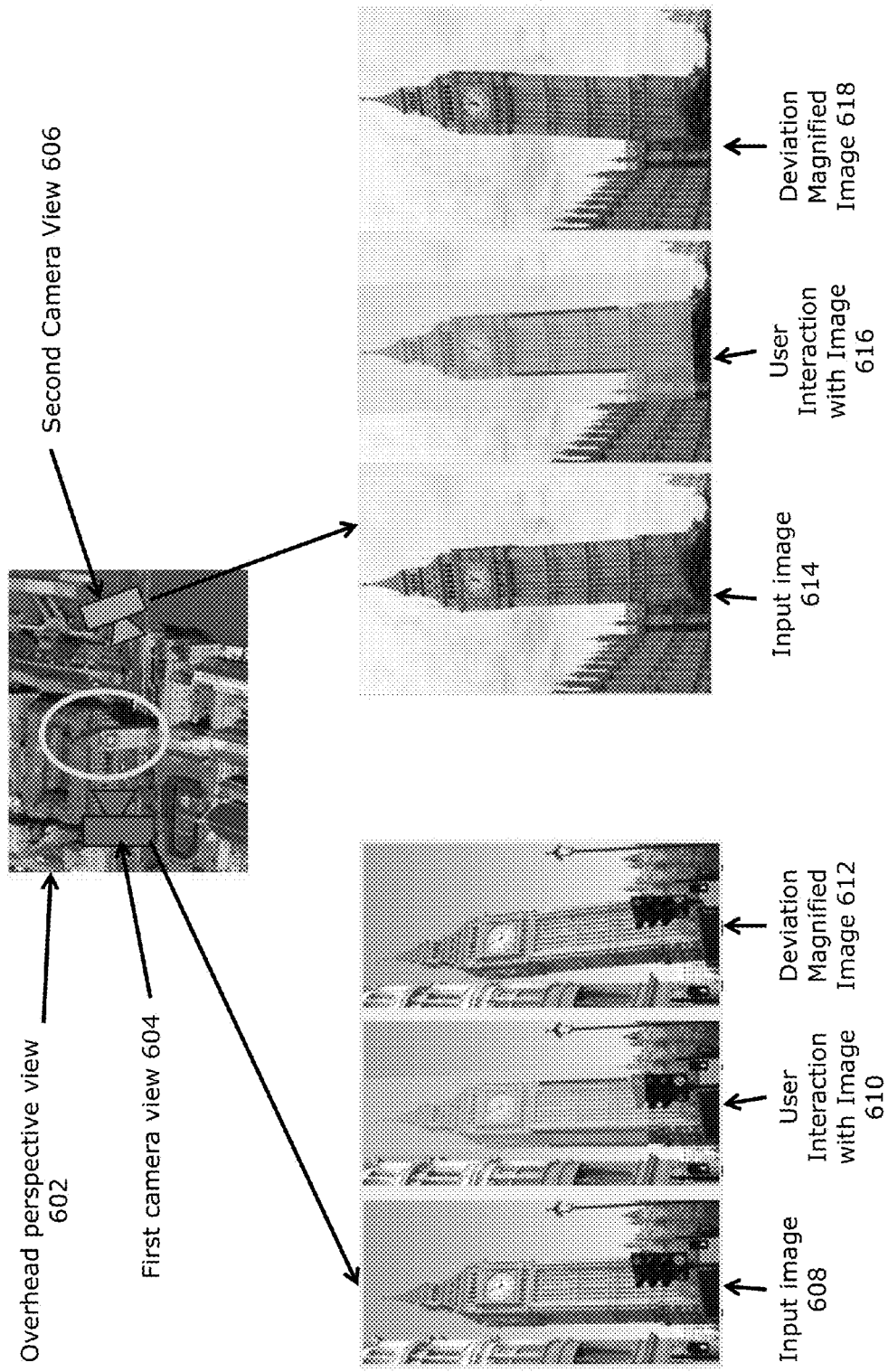
FIG. 6 is a diagram illustrating amplified deviations found at Elizabeth Tower, or Big Ben, the iconic landmark in England.

FIG. 6 is a diagram 600 illustrating amplified deviations found at Elizabeth Tower, or Big Ben, the iconic landmark in England. Civil engineers have reported that Elizabeth Tower (Big Ben) is leaning at an angle of 0.3 degrees from its true vertical. The present method reveals this visually in two independently processed images of the tower from different viewpoints as in FIG. 6. An overhead perspective view 602 reveals the first camera view 604 and second camera view 606 in relation to Big Ben. In relation to the first camera view, an input image 608 is interacted with a user to produce user interaction with image 610. Then, deviation magnification renders the deviation magnified image 612, illustrating the tilt of Big Ben. Further, the input image 614 of the second camera view 606, subsequent user interaction with image 616 and deviation magnified image 618 also shows a consistent tilt of Big Ben. The consistency across views shows the system works effectively. In this example, instead of directly using the edges of the tower as the fitted geometry, vertical lines through the vanishing point are used. To amplify only the tilting of the tower, which corresponds to low frequencies in the deviation signal, while ignoring deviations due to bricks on the tower (e.g., high frequencies), a lowpass filter is applied to the deviation signal. The filtered signal is then extrapolated to the entire user-specified bounding box to warp the entire tower. The size of the deviations for lines on the tower are on average 2-3× larger than the deviation of lines on other buildings indicating a difference in the detection of the tilt of the tower compared to the tilt of the other buildings. Visualizing the subtle tilt of buildings may give civil engineers a new tool for structural monitoring. Lens distortion can also be corrected as a processing step The above method can further be applied to video sequences. However, the method is applied to each frame independently, without using any temporal information. In other words, each frame is deviation magnified without information from any previous or subsequent frame. The fitted shapes in each frame can be detected automatically. A person of ordinary skill in the art can recognize that manual detection of the fitted shapes is also possible, but can be labor intensive for a video sequences with hundreds, thousands, or more frames. For video sequences, results of the present method can be compared to motion magnification applied to stabilized versions of the sequences.

FIGS. 7A-B are diagrams 700 and 710 illustrating frames of a a high speed video (e.g., 13,000 FPS) of a lacrosse ball hitting a black table in front of a black background. FIG. 7E is a diagram 740 illustrating trajectory of the ball throughout the video sequence.

FIGS. 7C-D are diagrams illustrating a rendering from the present method of the two input frames where the deviation is ten times larger. The method reveals the distortion in the shape of the ball (e.g., deviation from a perfect circle) when it hits the ground in FIG. 7D and travels upward from impact.

FIG. 7F is a diagram illustrating the raw deviation signal for the moment of impact (e.g., FIGS. 7B and 7D) as a function of the angle of the edge of the ball from the center of the ball, in radians. Because the raw deviation signal appears to have most of its signal in a low frequency sinusoid, applying filtering to isolate it removes such noise. Deviation magnification reveals the deformation of the ball at the moment it hits the ground, and also reveals the ball's post-impact vibrations.

For comparison, applying motion magnification, which analyzes a sequence of frames temporally, and not each frame independently, to videos with and without stabilizing the input video does not yield the same results. Without stabilization, motion magnification fails because the ball's displacement from frame to frame is too large. With stabilization, motion magnification results are more reasonable, but deviations from moment of impact are not as pronounced because the motion signal has a temporal discontinuity when the ball hits the surface that is not handled well by motion magnification. In contrast, deviation magnification handles this discontinuity, as each frame is processed independently.

Figure 8B:
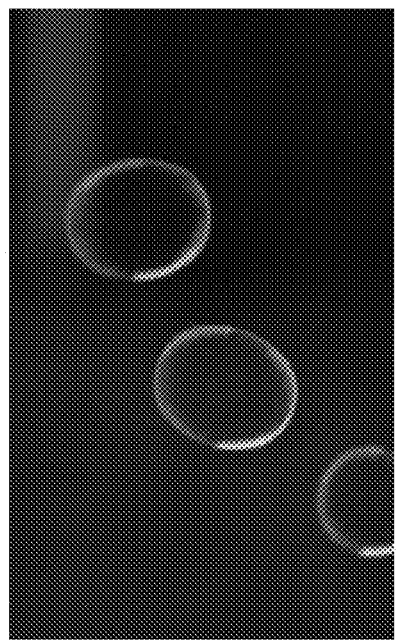
FIGS. 8A-B are diagrams, respectively, illustrating frames of a high speed video (e.g., 2,000 FPS) of soap bubbles moving to the right shortly after their generation.
Figure 8A:
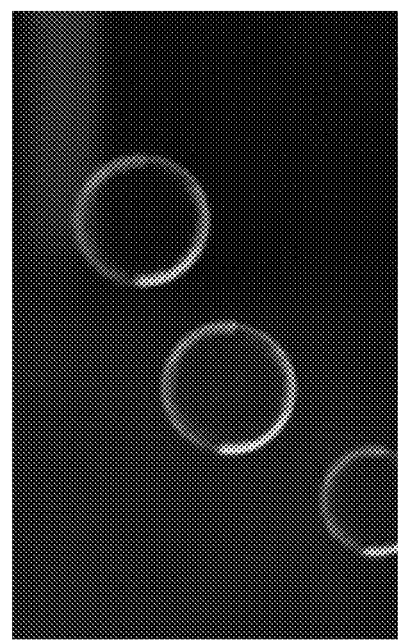

FIGS. 8A-B are diagrams 800 and 850, respectively, illustrating frames of a high speed video (e.g., 2,000 FPS) of soap bubbles moving to the right shortly after their generation. Surface tension causes the bubbles to take a spherical shape. However, vibrations of the bubble and gravity can cause the bubble's shape to subtly change. In this sequence, the method automatically detects the best fit circles for the two largest bubbles, and amplifies the deviations corresponding to low frequencies independently in each frame. This allows for visualizing both the changing dynamics of the bubble and a consistent change in the bubble that may be due to gravity.

For comparison, motion magnification was applied to a stabilized version of the sequence (not shown). Circles were fitted to align the bubbles in time, and then subsequently applied motion magnification. The magnified bubbles were then embedded back in the input video at their original positions using linear blending at the edges. This carefully applied and labor intensive processing can also reveal the changing shape of the bubbles over time, but it does not show the deviations of the buble from the ideal circular shape that do not change in time, such as the effect of gravity on the bubble.

Figure 9:
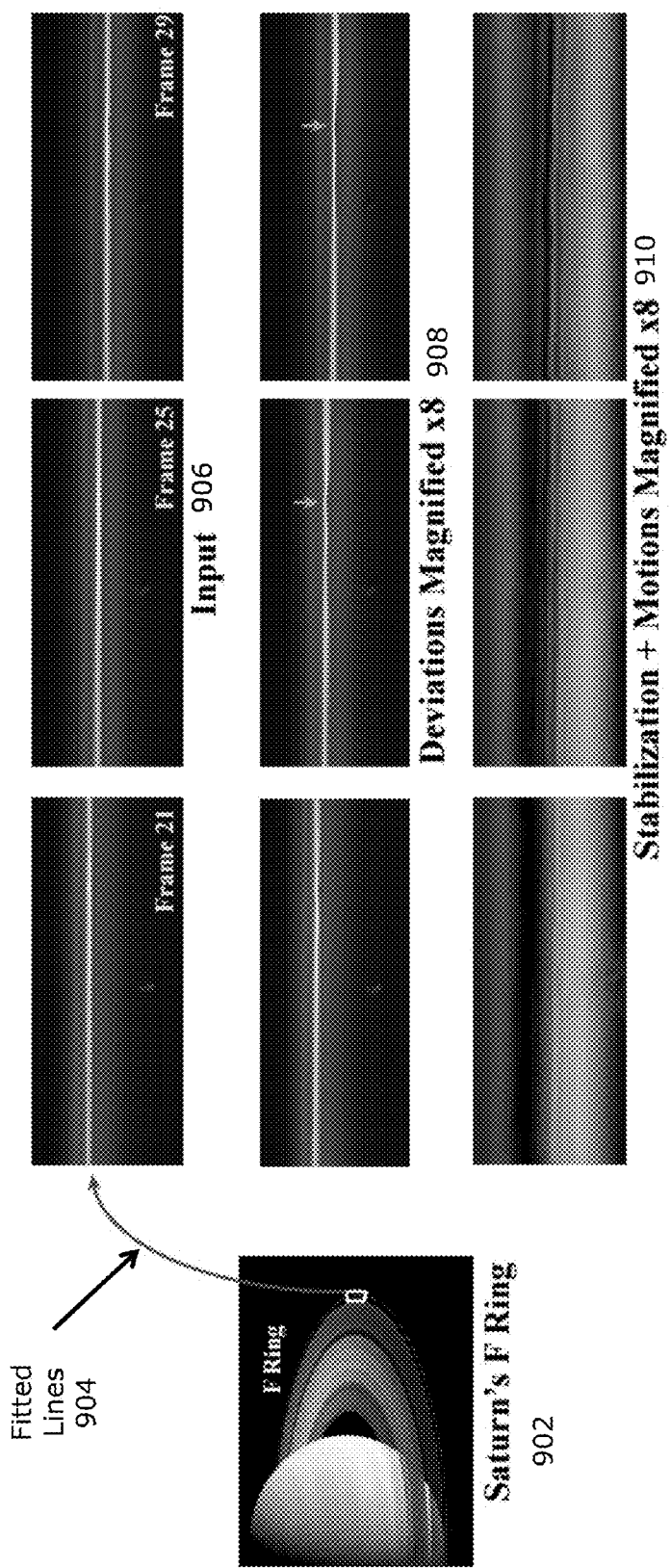
FIG. 9 is a diagram illustrating three input frames from a 72-frame time lapse, captured by the Cassini orbiter, showing Saturn's moon Prometheus interacting with Saturn's F-ring.

FIG. 9 is a diagram 900 illustrating three input frames 906 from a 72-frame time lapse, captured by the Cassini orbiter, showing Saturn's moon Prometheus interacting with Saturn's F-ring 902. The input frames 906 are aligned such that the vertical axis is the distance from Saturn, which causes the rings to appear as horizontal lines. For every frame in the timelapse video, deviation magnification amplified the deviations from the best-fit straight lines, which are marked in red in Frame 21 of the input frames 906. The 8× magnified deviations 908 reveals a nearly invisible, temporally consistent ripple. These kind of ripples are known to occur when moons of Saturn approach its rings due to the gravity of the moon. Applying deviation magnification technique on such images may be useful for astronomers studying these complex interactions, and can reveal new undiscovered gravitational influences in the rings.

In contrast, applying motion magnification 910 to a stabilized version of the time lapse sequence does not yield the high quality results of deviation magnification. Even with stabilization, magnifying changes over time produces many unwanted artifacts due to temporal changes in the scene unrelated to the main ring. The spatial deviations from the model shape, amplified by the present system and method, are primarily interesting in this example, rather than the changes in time, which are amplified by previous methods such as motion magnification.

Figure 10:
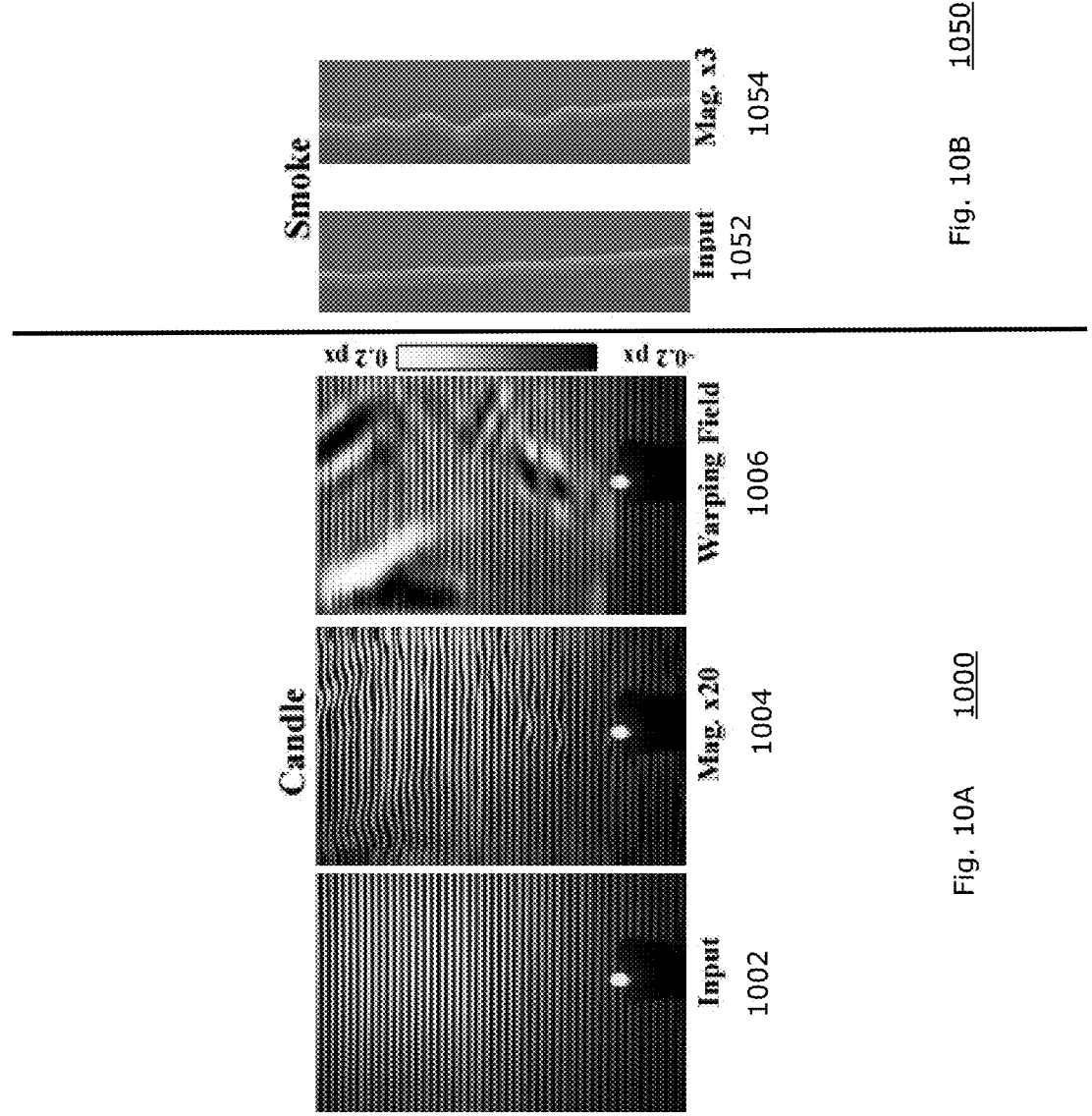
FIG. 10A is a diagram illustrating deviation magnification revealing heated air generated by a candle flame from an image.
FIG. 10B is a diagram illustrating an input image and deviation magnified image of a column of rising smoke appears to be a mostly straight line.

FIG. 10A is a diagram 1000 illustrating deviation magnification revealing heated air generated by a candle flame from an image 1002. To do so, the deviation magnification estimate the deviations from every straight line, automatically fitted to the background. As can be seen in the candle magnified twenty times 1004, and the corresponding warping field 1006, deviation magnification reveals the flow of the hot air. Visualizing such flow has applications in many fields, such as aeronautical engineering and ballistics. Other methods of recovering such flow such as background-oriented schlieren and refractive wiggles, analyze changes over time. However, background-oriented schlieren and referactive wiggles based methods are limited to a camera in a static location and orientation, the deviation magnification method is applied to every frame of the video independently and is able to reveal the heated air even when the camera freely moves. In addition, bumps in the background are revealed as well. Spatially stabilizing such a sequence is prone to errors because the background is one-dimensional, the camera's motions are complex, and the candle and background are at different depths.

FIG. 10B is a diagram 1050 illustrating an input image 1052 and deviation magnified image 1054 of a column of rising smoke appears to be a mostly straight line. Amplifying the deviations from straight, however, reveals sinusoidal instabilities that occur in the smoke's flow as it transitions from laminar to turbulent. Again, the processing is performed on each frame independently, even if FIGS. 10A-B originated from a time-sequence of frames.

Figure 11:
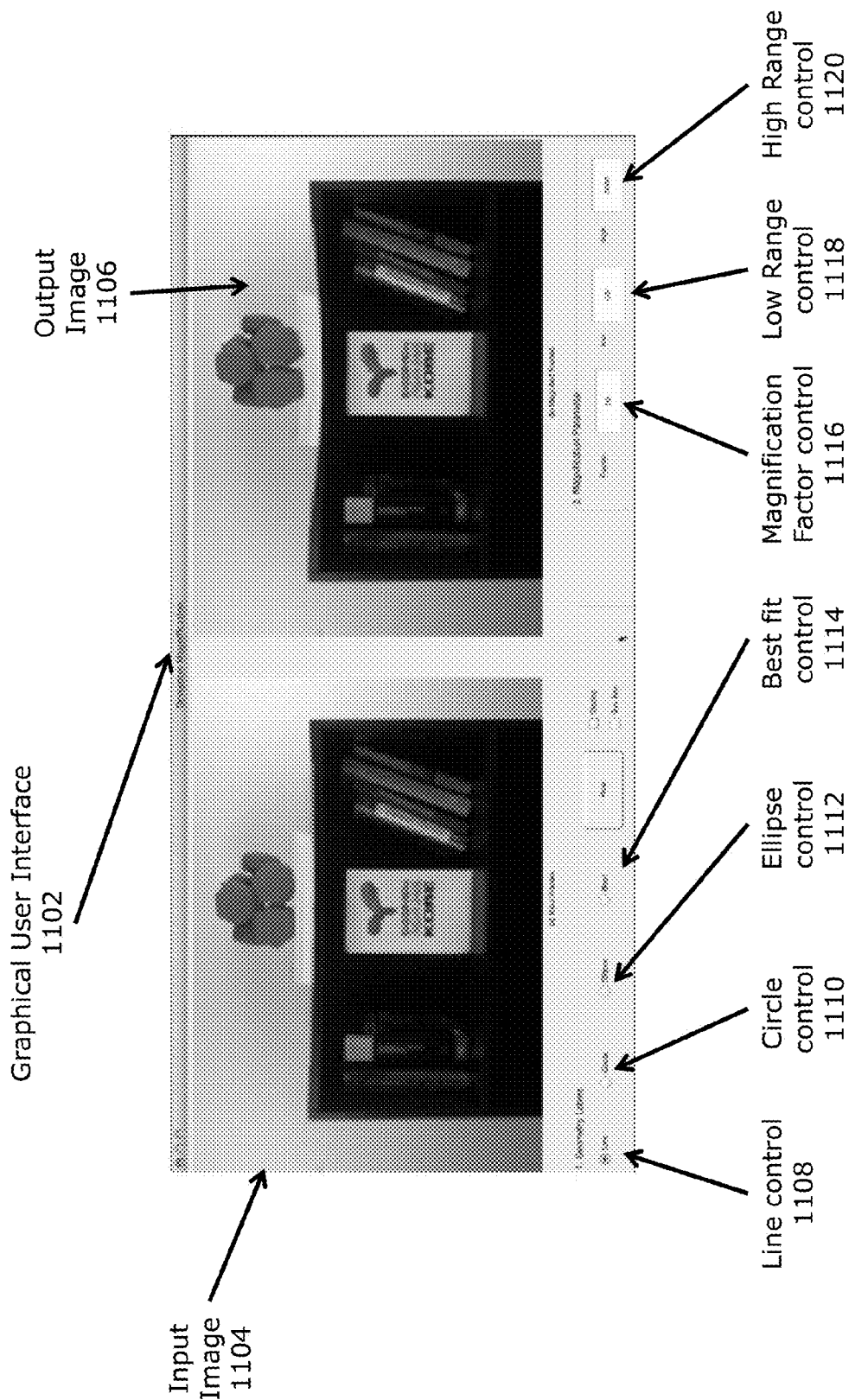
FIG. 11 is a diagram illustrating a further embodiment of a graphical user interface 1002 of the present invention processing a 200×150 pixel video at 5 frames per second, each frame being analyzed seperately.

FIG. 11 is a diagram 1100 illustrating a further embodiment of a graphical user interface 1002 of the present invention processing a 200×150 pixel video at 5 frames per second, each frame being analyzed seperately. The user can roughly specify the location of a line after selecting a line control 1108 on the input image of a frame, which is then automatically snapped to a contour. An output image is generated magnifying the deviations alone the user specified line. Alternatively, the user can select a circle shape by selecting the circle control 1110, an ellipse by selecting the ellipse control 1112, or a best fit by selecting the best fit control 1114. Further, the graphical user interface 1102 provides a manification factor control 1116 to control the constant applied to magnification, and a low range control 1118 and high range control 1120 to control the range of deviation allowed.

Figure 12:
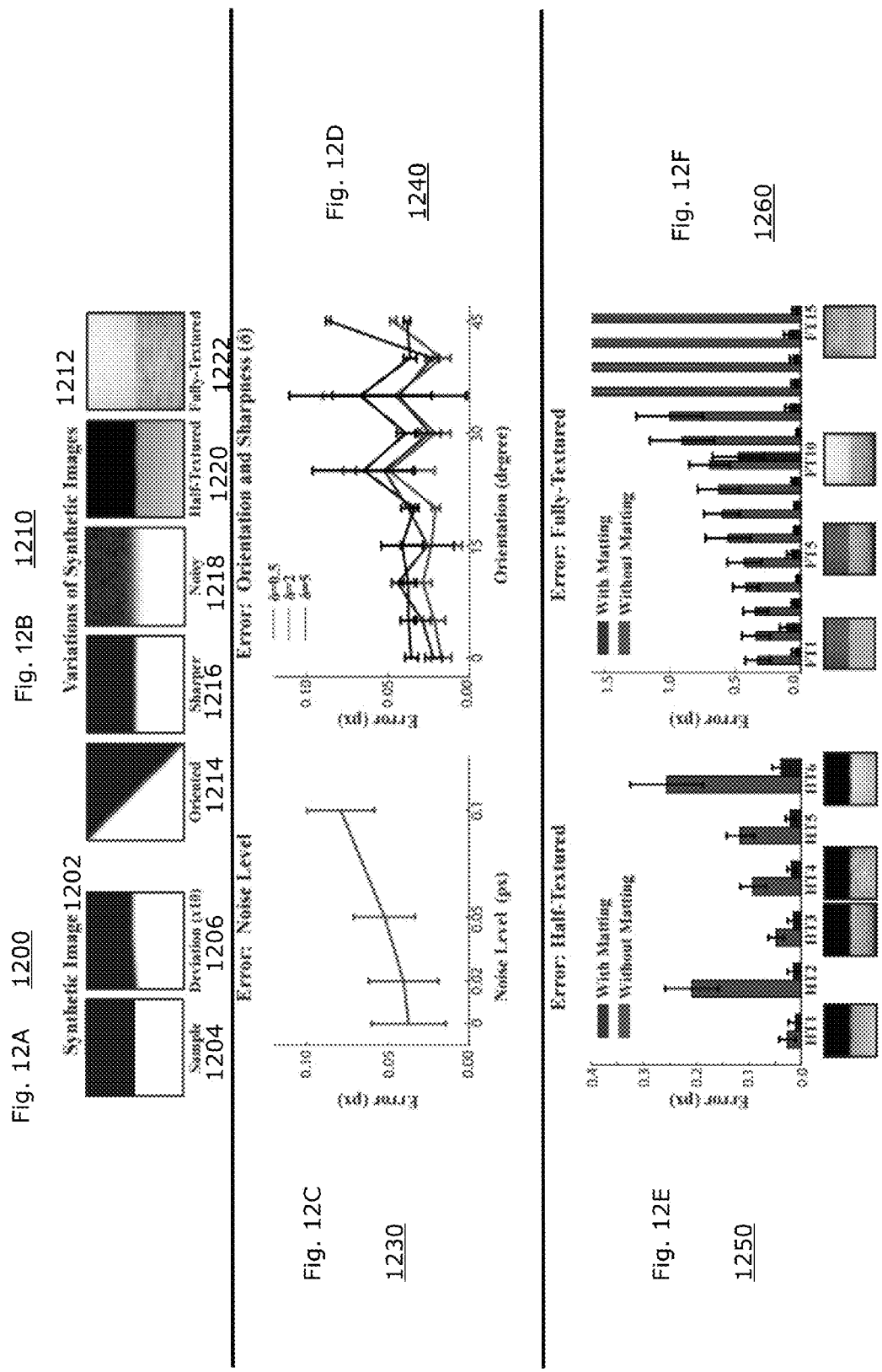
FIGS. 12A-B are diagrams illustrating evaluation the accuracy of estimating the deviation signal tested on a set of synthetic images.
FIG. 12C is a graph illustrating an error rate of the deviation magnification as a function of an added noise level (in px), which grows only linearly with the noise-level even when it is 25 intensity levels ($\sigma$=0.1).
FIG. 12D is a graph illustrating mean absolute error between the estimated deviation signal and the ground truth as a function of the line orientation, for the three edge sharpness levels.
FIG. 12E is a graph illustrating error rate as a function of six different textures to perform experiments in which only one side of the edge was textured to quantify the effect of texture and the ability of matting to remove it.
FIG. 12F is a graph illustrating error rate as a function of both sides being textured using 15 combinations of the six textures.

FIGS. 12A-B are diagrams 1200 and 1210 illustrating evaluation the accuracy of estimating the deviation signal tested on a set of synthetic images 1202. The synthetic images 1202 have known subtle geometric deviations, as shown by the 10× magnified 1206 version of the sample 1204. Deviation magnification method results can then be to the known deviation shown in 1206. FIG. 12B's variations of synthetic images 1212 illustrates, the exact deviation, the orientation 1214, the sharpness of the edge 1216, the noise level 1218, and the texture 1220, 1222 on either side of the edge were varried.

For testing, example variations can be ten different cubic spline functions with a maximum magnitude of 1 pixel as the deviation shapes. Ten orientations are sampled uniformly from 0 to 45 with an increment of 5. The edge profile is set as a sigmoid function $$sigmf(\delta, x) = \frac{1}{1 + \exp(-\delta x)}$$

with $\delta = \{0.5, 2.5\}$.

FIG. 12C is a graph 1230 illustrating an error rate (in px) of the deviation magnification as a function of an added noise level (in px), which grows only linearly with the noise-level even when it is 25 intensity levels ($\sigma=0.1$). For testing, images were evaluated without texture, with texture, and with added sensor noise by adding white Gaussian noise with standard deviation $\sigma = \{0.02, 0.05, 0.1\}$.

FIG. 12D is a graph 1240 illustrating mean absolute error between the estimated deviation signal and the ground truth as a function of the line orientation, for the three edge sharpness levels. The average error is very small at 0.003 px, 3% of the maximum magnitude of the ground truth deviation signal (1 px). As expected, smoother edge profiles lead to smaller errors due to less aliasing.

FIG. 12E is a graph 1250 illustrating error rate (in px) as a function of six different textures to perform experiments in which only one side of the edge was textured to quantify the effect of texture and the ability of matting to remove it.

FIG. 12F is a graph 1260 illustrating error rate (in px) as a function of both sides being textured using 15 combinations of the six textures.

FIGS. 12E-F illustrate mean absolute error with and without matting for one-sided, half-textured images and two-sided, fully-textured images, respectively. Without matting, the average error of deviation magnification is approximately 0.3 px for the half-textured examples and 1.5 px for the fully-textured examples. With matting, the average errors shrink by ten times and are only 0.03 px and 0.1 px respectively. The highest errors are on a synthetic image, in which both sides of the image are of similar color.

Figure 13:
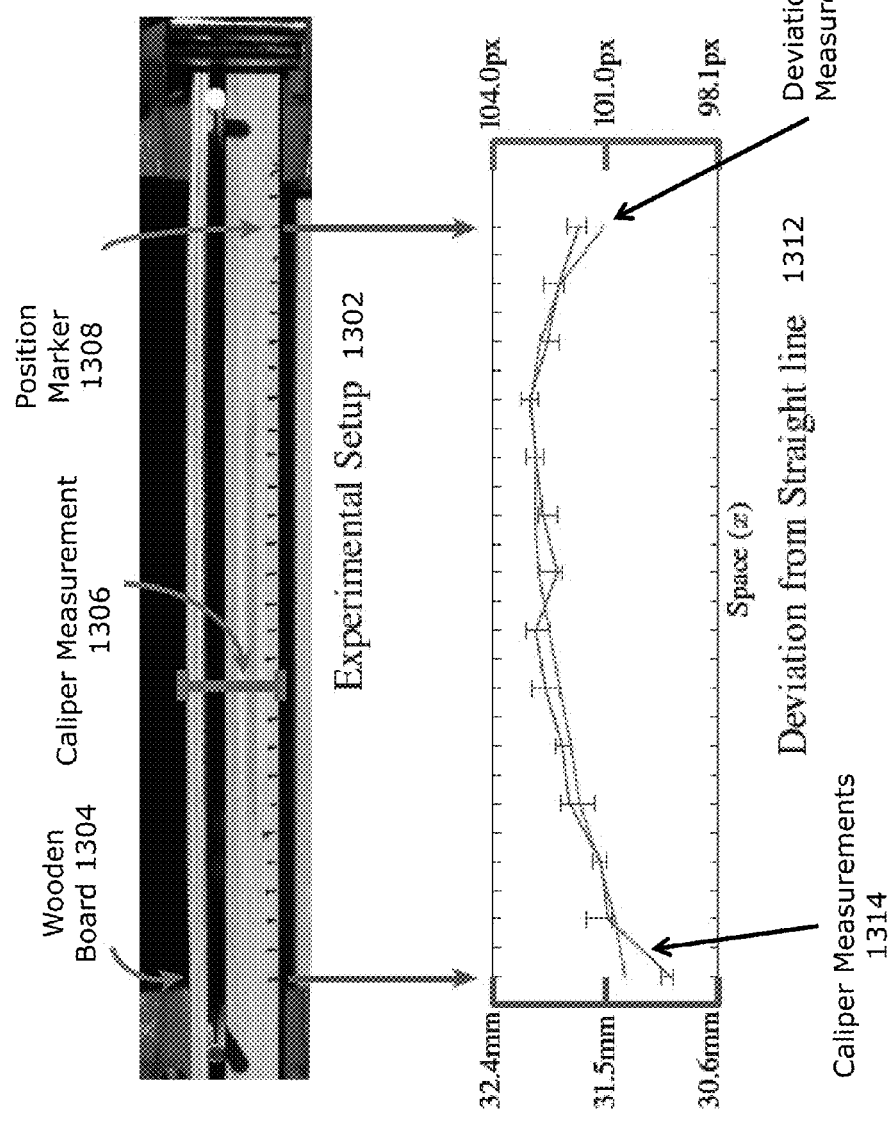
FIG. 13 is a diagram illustrating a wooden board affixed on top of two rods on a table using C-clamps.

FIG. 13 is a diagram 1300 illustrating a wooden board 1304 affixed on top of two rods on a table using C-clamps. The deviations from a straight line of a flexible wooden board 1304 were physically measured with a caliper measurement 1306. The base of the table served as the reference straight line. The distance from the bottom of the table to the top of the board was measured across a 29 cm stretch of it, in 2 cm increments using digital calipers 1306, shown as the markers in FIG. 13.

The deviation from straight line 1312 graph illustrates the deviation signal from a straight line of the image of the wooden board, at each position 1308, is similar to the caliper measurements.

Figure 14B:
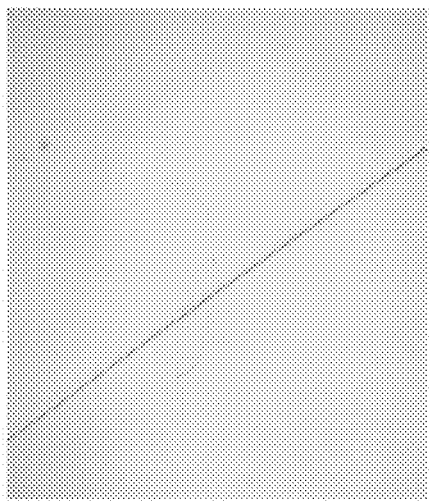
FIG. 14B illustrates an outline of the stick representing the path of the source of deformation in the input image of FIG. 14A.
Figure 14D:
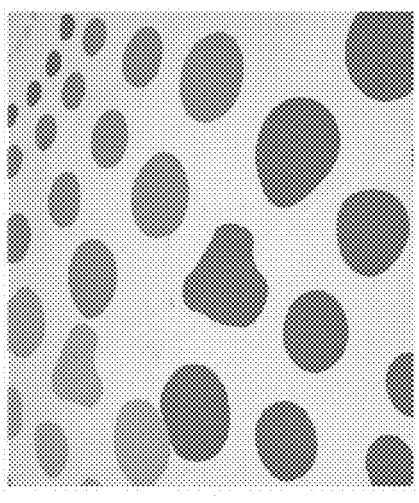
FIG. 14D is a diagram illustrating deviation magnification (×7) of the ellipses, showing ellipses on or near the stick deform significantly, which reveals the stick's unobserved location.
Figure 14A:
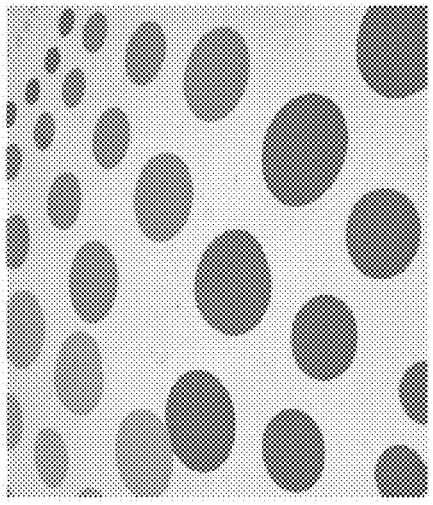
FIG. 14A is a diagram of a second experiment affixed a stick onto a table and covered it with a sheet having a pattern of ellipses, captured as input frame.
Figure 14C:
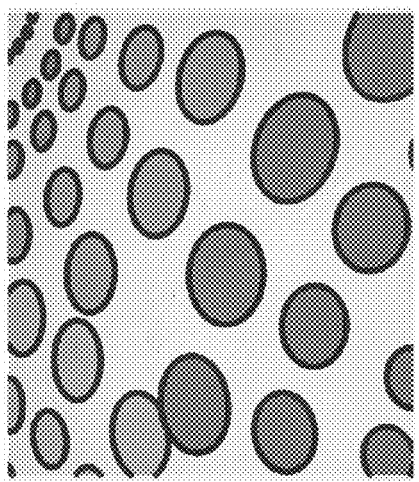
FIG. 14C is a diagram illustrating automatically detecting fitted ellipses in the input image to apply deviation magnification of each detected ellipse from its fitted shape.

FIG. 14A is a diagram 1400 of a second experiment affixed a stick onto a table and covered it with a sheet having a pattern of ellipses, captured as input frame 1402. FIG. 14B illustrates an outline of the stick representing the path of the source of deformation 1412 in the input image 1402 of FIG. 14A. The stick causes the sheet to slightly deform, which subtly changed the shape of some of the ellipses. FIG. 14C is a diagram 1420 illustrating automatically detecting fitted ellipses 1422 in the input image to apply deviation magnification of each detected ellipse from its fitted shape. A bandpass filter can be applied to the deviation signal to remove overall translation due to slight errors in fitting and to smooth out noise. FIG. 14D is a diagram 1430 illustrating deviation magnification (×7) 1432 of the ellipses, showing ellipses on or near the stick deform significantly, which reveals the stick's unobserved location.

While deviation magnification as above is specifically described for lines, circles, and ellipses, a person of ordinary skill in the art can recognize that deviation magnification can generalize to any arbitrary shape. After the shape is fitted to a geometry, the canonical image stripe conversion abstracts each shape to a general stripe, and therefore deviation magnification can generalize to arbitrary shapes. Even if automatic geometric fitting is not successful, if a user can specify the location of a contour in an image, deviation magnification can be applied. For higher-order shapes such as splines, it can be unclear what should be a deviation and what should be part of the fitted model.

In certain specific circumstances, deviation magnification can encounter difficulties. For example, if the colors on both sides of the shape's contour are similar, computing the shape's sub-pixel location can be difficult. This is an inherent limitation in matting and edge localization. In some cases, changes in appearance along the contour may look like geometric deviations (e.g. a shadow on the object that is the color of the background). In this case, the deviation signal may have a few outliers in it, but otherwise be reliable.

In addition, deviation magnification may also not be able to distinguish artifacts caused by a camera's rolling shutter from a true geometric deviation in the world. If the camera or object of interest is moving, the camera's rolling shutter could cause an artifactual deviation present in the image, but not in the world. Deviation magnification detects this and reveals it. Bad imaging conditions such as low-light or fast-moving objects can cause a image with prohibitive noise with motion blur, which would be difficult for deviation magnification to process.

Figure 16:
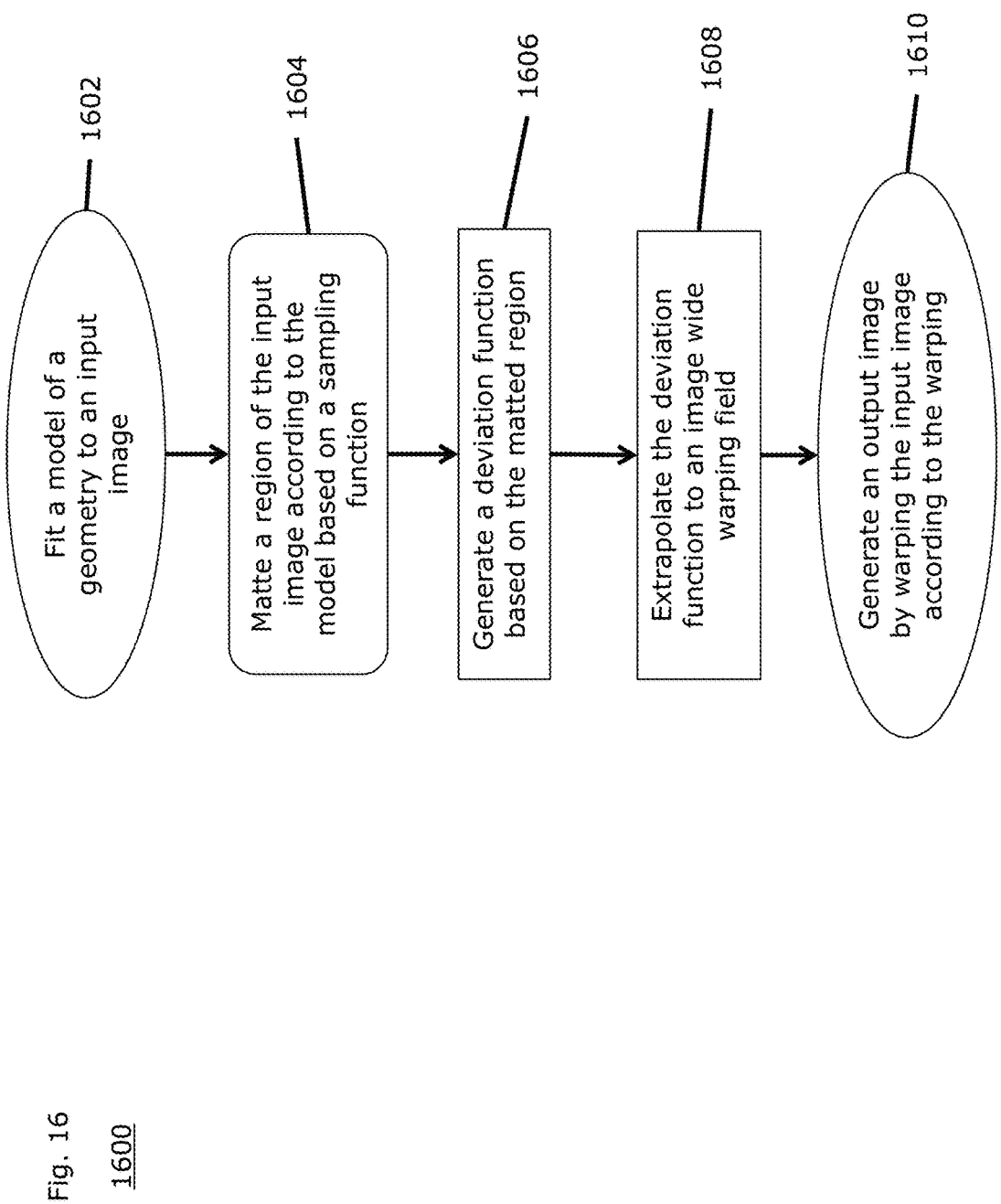
FIG. 16 is a flow diagram illustrating an example embodiment of a process employed by the present invention.

FIG. 16 is a flow diagram 1600 illustrating an example embodiment of a process employed by the present invention. The process fits a model of a geometry to an input image (1602). Then the process mattes a region of the input image according to the model based on a sampling function (1604). The process then generates a deviation function based on the matted region (1606). The process then extrapolates the deviation function to an image wide warping field (1608). Then, the process generates an output image by warping the input image according to the warping. (1610).

FIG. 17 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

FIG. 18 is a diagram of an example internal structure of a computer (e.g., client processor/device 50 or server computers 60) in the computer system of FIG. 17. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 17). Memory 90 provides volatile storage for computer software instructions 92 and data 94 used to implement an embodiment of the present invention (e.g., geometric fitting module, matting module, analysis module, conversion module, and warping module code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
fitting a model of a geometry to a digital input image;
matting a region of the digital input image according to the model based on a sampling function;
generating a deviation function based on the matted region, the deviation function representing a deviation of the matted region of the digital input image from the model;
extrapolating the deviation function to an image wide warping field; and
generating a digital output image by warping the digital input image according to the image wide warping field.

2. The method of claim 1, wherein:
generating the deviation function further includes generating a function $f(x)$,
x represents coordinates of one of the axes,
the value $f(x)$ is based on a value of $$\frac{\sum_y (I(x,y) - S(y))S'(y)}{\sum_y S'(y)^2},$$

I(x,y) represents an intensity profile of the matted region for given co-ordinates x and y, and
S(y) represents an average of edge profiles for all values of x in relation to the matted region.

3. The method of claim 1, wherein fitting the model of the geometry to the digital input image further includes:
receiving an approximate model of a geometry from user input; and
fitting the model of the geometry based on a best match of the approximate model to the digital input image.

4. The method of claim 1, wherein fitting a model of a geometry to an input image includes automatically detecting at least one model of the digital input image.

5. The method of claim 1, wherein the model can be expressed by a parametric equation.

6. The method of claim 1, wherein the sampling function further transforms the region of the digital input image to a canonical image stripe.

7. The method of claim 1, wherein:
fitting the model of the geometry to the digital input image includes fitting a plurality of models of at least one geometry to the digital input image;
matting the region of the digital input image further includes matting each region corresponding to each plurality of the models;
generating the deviation function further includes generating a plurality of deviation functions each based on a corresponding matted region;
extrapolating the deviation function to an image wide warping field further includes extrapolating each deviation function to a plurality of image wide warping fields; and
generating the digital output image by warping the digital input image according to each image wide warping field.

8. The method of claim 1, further comprising:
generating an output video based on a plurality of digital output images generated by performing the method of claim 1 separately on a series of frames independently.

9. The method of claim 1, wherein generating the digital output image further includes limiting the warping of the digital input image to at least one of (a) a user defined region, (b) a color change in the image, (c) a geometric change in the image, or (d) a region attenuated by distance from the model.

10. A system comprising:
a processor; and
a memory with computer code instructions stored therein, the memory operatively coupled to said processor such that the computer code instructions configure the processor to implement:
fit a model of a geometry to digital input image;
matte a region of the digital input image according to the model based on a sampling function;
generate a deviation function based on the matted region, the deviation function representing a deviation of the matted region of the digital input image from the model;
extrapolate the deviation function to an image wide warping field; and
generate a digital output image by warping the digital input image according to the image wide warping field.

11. The system of claim 10, wherein:
generating the deviation function includes generating a function $f(x)$,
x representing coordinates of one of the axes,
the value $f(x)$ is based on a value of $$\frac{\sum_y (I(x,y) - S(y))S'(y)}{\sum_y S'(y)^2},$$

I(x,y) represents an intensity profile of the matted region for given co-ordinates x and y, and
S(y) represents an average of edge profiles for all values of x in relation to the matted region.

12. The system of claim 10, wherein fitting the model further includes:
receiving an approximate model of a geometry from user input; and
fitting the model of the geometry based on a best match of the approximate model to the digital input image.

13. The system of claim 10, wherein fitting the model further automatically detects at least one model of the digital input image.

14. The system of claim 10, wherein the model can be expressed by a parametric equation.

15. The system of claim 10, wherein the sampling function further transforms the region of the digital input image to a canonical image stripe.

16. The system of claim 10, wherein:
fitting the model of the geometry to the digital input image includes fitting a plurality of models of at least one geometry to the input image;
matting the region of the digital input image further includes matting each region corresponding to each plurality of the models;
generating the deviation function further includes generating a plurality of deviation functions each based on a corresponding matted region;
extrapolating the deviation function to an image wide warping field further includes extrapolating each deviation function to a plurality of image wide warping fields; and
generating the digital output image by warping the digital input image according to each image wide warping field.

17. The system of claim 10, wherein the processor is further configured to:
generate an output video based on a plurality of digital output images generated by employing the system of claim 10 separately on a series of frames independently.

18. The system of claim 10, wherein the processor is further configured to limit the warping of the digital input image to at least one of (a) a user defined region, (b) a color change in the image, (c) a geometric change in the image, or (d) a region attenuated by distance from the model.

19. A non-transitory computer-readable medium configured to store instructions for analyzing an image, the instructions, when loaded and executed by a processor, causes the processor to:
fit a model of a geometry to a digital input image;
matte a region of the digital input image according to the model based on a sampling function;
generate a deviation function based on the matted region, the deviation function representing a deviation of the matted region of the digital input image from the model;
extrapolate the deviation function to an image wide warping field; and
generate a digital output image by warping the digital input image according to the image wide warping field.

20. The non-transitory computer-readable medium of claim 19, the instructions further cause the processor to:
generate the deviation function further includes generating a function $f(x)$,
x represents coordinates of one of the axes, the value $f(x)$ is based on a value of $$\frac{\sum_y (I(x, y) - S(y))S'(y)}{\sum_y S'(y)^2},$$

I(x,y) represents an intensity profile of the matted region for given co-ordinates x and y, and
S(y) represents an average of edge profiles for all values of x in relation to the matted region.

\* \* \* \* \*